US012572537B2

(12) United States Patent (10) Patent No.: US 12,572,537 B2
Siddiqui et al. (45) Date of Patent: Mar. 10, 2026

(54) LEARNED RESOURCE CONSUMPTION MODEL FOR OPTIMIZING BIG DATA QUERIES

(71) Applicant: Microsoft Technology Licensing, LLC, Redmond, WA (US)

(72) Inventors: Tarique Ashraf Siddiqui, Champaign, IL (US); Alekh Jindal, Sammamish, WA (US); Shi Qiao, Bellevue, WA (US); Hiren S. Patel, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1173 days.

(21) Appl. No.: 16/511,966

(22) Filed: Jul. 15, 2019

(65) Prior Publication Data

US 2020/0349161 A1 Nov. 5, 2020

Related U.S. Application Data

(60) Provisional application No. 62/840,897, filed on Apr. 30, 2019.

(51) Int. Cl.
 *G06F 16/24* (2019.01)
 *G06F 16/21* (2019.01)
 (Continued)
(52) U.S. Cl.
 CPC ...... *G06F 16/24542* (2019.01); *G06F 16/211* (2019.01); *G06F 16/2246* (2019.01); *G06N 20/20* (2019.01)
(58) Field of Classification Search
 CPC ............. G06F 16/24542; G06F 16/211; G06F 16/2246; G06F 16/24537; G06N 20/20
 See application file for complete search history.

(56) References Cited

U.S. PATENT DOCUMENTS

2011/0153593 A1 6/2011 Zhou
2014/0280159 A1* 9/2014 Cao ..................... G06F 16/2456
707/737

(Continued)

FOREIGN PATENT DOCUMENTS

CN 104871154 A 8/2015

OTHER PUBLICATIONS

"Apache Calcite", Retrieved from: https://calcite.apache.org/, May 28, 2019, 2 Pages.

(Continued)

*Primary Examiner* — Apu M Mofiz
*Assistant Examiner* — Cindy Nguyen
(74) *Attorney, Agent, or Firm* — Weaver IP L.L.C.

(57) ABSTRACT

Methods, systems, apparatuses, and computer program products are provided for evaluating a resource consumption of a query. A logical operator representation of a query generated to be executed (e.g., obtained from a query generating entity) may be determined. The logical operator representation may be transformed to a plurality of different physical operator representations for executing the query. A plurality of resource consumption models may be applied to each of the physical operator representations to determine a resource consumption estimate for the physical operator representation. The resource consumption models may be trained in different manners based at least on a history of query executions, such that each model may have different granularity, coverage and/or accuracy characteristics in estimating a resource consumption of a query. Based on the determined resource consumption estimates for the physical operator representations, a particular one of the physical operator representations may be selected to execute the query.

20 Claims, 9 Drawing Sheets

(51) Int. Cl.
  *G06F 16/22* (2019.01)
  *G06F 16/2453* (2019.01)
  *G06N 20/20* (2019.01)

(56) References Cited

U.S. PATENT DOCUMENTS

| | | | | |
|---|---|---|---|---|
| 2017/0126795 | A1 | 5/2017 | Kumar | |
| 2018/0060389 | A1* | 3/2018 | Hwang | G06F 16/24542 |
| 2020/0097582 | A1* | 3/2020 | Jedek | G06F 3/0659 |
| 2020/0285642 | A1* | 9/2020 | Bei | G06F 11/302 |

OTHER PUBLICATIONS

"Apache Flink", Retrieved from : https://flink.apache.org/, May 28, 2019, 3 Pages.
"Apache Hive", Retrieved from: https://hive.apache.org/, May 28, 2019, 2 Pages.
"Apache Spark", Retrieved from: https://spark.apache.org/, May 28, 2019, 4 Pages.
Nick., "Asimov System", Retrieved from: https://mywindowshub. com/microsoft-uses-real-time-telemetry-asimov-build-test-update-windows-9/, Sep. 29, 2014, 2 Pages.
"Azure Data Lake", Retrieved from: https://azure.microsoft.com/ en-in/solutions/data-lake/, May 28, 2019, 8 Pages.
"Azure SQL Database", Retrieved from: https://azure.microsoft. com/en-us/services/sql-database/, May 28, 2019, 17 Pages.
"Google BigQuery", Retrieved from https://cloud.google.com/ bigquery, Retrieved On: Mar. 5, 2018, 20 Pages.
"IBM BigSQL", Retrieved from: https://www.IBM.com/products/ db2-big-sql, May 28, 2019, 6 Pages.
Agarwal, et al., "Re-optimizing Data-Parallel Computing", In Proceedings of the 9th USENIX Symposium on Networked Systems Design and Implementation, Apr. 25, 2012, 14 Pages.
Agrawal, et al., "Automated Selection of Materialized Views and Indexes in SQL Databases", In Proceedings of VLDB, Sep. 10, 2000, 10 Pages.
Agrawal, et al., "Integrating Vertical and Horizontal Partitioning into Automated Physical Database Design", In Proceedings of the ACM SIGMOD International Conference on Management of Data, Jun. 13, 2004, pp. 359-370.
Akdere, et al., "Learning-Based Query Performance Modeling and Prediction", In Proceedings of the IEEE 28th International Conference on Data Engineering, Apr. 1, 2012, pp. 390-401.
Alipourfard, et al., "Cherrypick: Adaptively Unearthing the Best Cloud Configurations for Big Data Analytics", In 14th USENIX Symposium on Networked Systems Design and Implementation NSDI, 2017, pp. 469-482.
Bach, et al., "Kernel Independent Component Analysis", In Journal of Machine Learning Research, vol. 03, Jul. 2002, 48 Pages.
Bruno, et al., "Continuous Cloud-Scale Query Optimization and Processing", In Proceedings of the VLDB Endowment, vol. 6, Issue 11, Aug. 27, 2013, pp. 961-972.
Chaiken, et al., "SCOPE: Easy and Efficient Parallel Processing of Massive Data Sets", In Proceedings of the VLDB Endowment, vol. 1, Issue 2, Aug. 1, 2008, pp. 1265-1276.
Chaudhuri, et al., "Estimating Progress of Execution for SQL Queries", In Proceedings of the ACM SIGMOD International Conference on Management of Data, Jun. 13, 2014, pp. 803-814.
Chaudhuri, et al., "Self-tuning Database Systems: A Decade of Progress", In Proceedings of 33rd International Conference on Very Large Data Bases, Sep. 23, 2007, pp. 3-14.
Curino, et al., "Schism: A Workload-Driven Approach to Database Replication and Partitioning", In Proceedings of the VLDB Endowment, vol. 3, Issue 1-2, Sep. 1, 2010, 10 Pages.
Duan, et al., "Tuning Database Configuration Parameters with ituned", In Proceedings of the VLDB Endowment, vol. 2, Issue 1, Aug. 1, 2009, pp. 1246-1257.

Ganapathi, et al., "Predicting Multiple Metrics for Queries: Better Decisions Enabled by Machine Learning", In Proceedings of IEEE 25th International Conference on Data Engineering, Mar. 29, 2009, 12 Pages.
Graefe, Goetz, "The Cascades Framework for Query Optimization", In IEEE Data Engineering Bulletin, vol. 18, Issue 3, Sep. 1995, pp. 19-29.
Gupta, et al., "Index Selection for OLAP", In Proceedings 13th International Conference on Data Engineering, Apr. 7, 1997, 12 Pages.
Hara, et al., "Making Tree Ensembles Interpretable: A Bayesian Model Selection Approach", In Proceedings of the Twenty-First International Conference on Artificial Intelligence and Statistics, vol. 84, Jun. 29, 2016, 21 Pages.
Ives, et al., "An Adaptive Query Execution System for Data Integration", In Proceedings of the 1999 ACM SIGMOD International Conference on Management of Data, vol. 28, Issue 2, Jun. 1, 1999, pp. 299-310.
Jindal, et al., "Computation Reuse in Analytics Job Service at Microsoft", In Proceedings of the 2018 International Conference on Management of Data, May 27, 2018, pp. 191-203.
Jindal, et al., "Selecting Subexpressions to Materialize at Datacenter Scale", In Proceedings of the VLDB Endowment, vol. 11, Issue 7, Mar. 1, 2018, pp. 800-812.
Kraska, et al., "SageDB: A Learned Database System", In Proceedings of CIDR, 2019, 10 Pages.
Kraska, et al., "The Case for Learned Index Structures", In Proceedings of the International Conference on Management of Data, May 27, 2018, pp. 489-504.
Krishnan, et al., "Learning to Optimize Join Queries with Deep Reinforcement Learning", In Proceedings of CoRR, abs/1808. 03196, Aug. 9, 2018, 19 Pages.
Li, et al., "Robust Estimation of Resource Consumption for SQL Queries Using Statistical Techniques", In Proceedings of the VLDB Endowment, vol. 5, Issue 11, Jul. 1, 2012, pp. 1555-1566.
Lohman, Guy, "SIGMOD Blog", Retrieved from: http://wp.sigmod. org/?p=1075, Apr. 10, 2014, 10 Pages.
Luo, et al., "Toward a Progress Indicator for Database Queries", In Proceedings of the ACM SIGMOD International Conference on Management of Data, Jun. 13, 2004, 12 Pages.
Marcus, et al., "Deep Reinforcement Learning for Join Order Enumeration", In Proceedings of the First International Workshop on Exploiting Artificial Intelligence Techniques for Data Management, Jun. 10, 2018, 4 Pages.
Markl, et al., "Robust Query Processing through Progressive Optimization", In Proceedings of the ACM SIGMOD International Conference on Management of Data, Jun. 13, 2004, 12 Pages.
Rajan, et al., "PerfOrator: Eloquent Performance Models for Resource Optimization", In Proceedings of the Seventh ACM Symposium on Cloud Computing, Oct. 5, 2016, pp. 415-427.
Rao, et al., "Automating Physical Database Design in a Parallel Database", In Proceedings of the ACM SIGMOD International Conference on Management of Data, Jun. 3, 2002, 12 Pages.
Schad, et al., "Runtime Measurements in the Cloud: Observing, Analyzing, and Reducing Variance", In Proceedings of the VLDB Endowment, vol. 3, Issue 1-2, Sep. 1, 2010, 12 Pages.
Stillger, et al., "LEO-DB2's Learning Optimizer", In Proceedings of VLDB, vol. 1, Sep. 11, 2001, 10 Pages.
Valentin, et al., "DB2 Advisor: An Optimizer Smart Enough to Recommend its Own Indexes", In Proceedings of 16th International Conference on Data Engineering, 2000, 10 Pages.
Van Aken, et al., "Automatic Database Management System Tuning through Large-scale Machine Learning", In Proceedings of the 2017 ACM International Conference on Management of Data, May 9, 2017, pp. 1009-1024.
Venkataraman, et al., "Ernest: Efficient Performance Prediction for Large-scale Advanced Analytics", In Proceedings of 13th USENIX Symposium on Networked Systems Design and Implementation NSDI, 2016, pp. 363-378.
Viswanathan, et al., "Query and Resource Optimization: Bridging the Gap", In Proceedings of IEEE 34th International Conference on Data Engineering, Apr. 16, 2018, 4 Pages.

(56)  References Cited

OTHER PUBLICATIONS

Wu, et al., "Predicting Query Execution Time: Are Optimizer Cost Models Really Unusable?", In Proceedings of IEEE 29th International Conference on Data Engineering, Apr. 8, 2013, 18 Pages.

Wu, et al., "Towards a Learning Optimizer for Shared Clouds", In Proceedings of the VLDB Endowment, vol. 12, Issue 3, Nov. 1, 2018, pp. 210-222.

Zhou, et al., "Scope: Parallel Databases Meet MapReduce", In the International Journal on Very Large Data Bases, vol. 21 Issue 5, Oct. 2012, pp. 611-636.

"International Search Report and Written Opinion Issued in PCT Application No. PCT/US20/026018", Mailed Date: Jun. 26, 2020, 12 Pages.

"AWS Athena", Retrieved from: https://aws.amazon.com/athena/, Retrieved Date: Oct. 3, 2019, 07 Pages.

"MART", Retrieved from: http://statweb.stanford.edu/~jhf/MART. html, Mar. 6, 2015, 01 Page.

"RxFastTrees: Fast Tree", Retrieved from: https://docs.microsoft. com/en-us/machine-learning-server/r-reference/microsoftml/ rxfasttrees, Jul. 15, 2019, 08 Pages.

Boutin, et al., "Apollo: Scalable and Coordinated Scheduling for Cloud-Scale Computing", In Proceedings of the 11th USENIX conference on Operating Systems Design and Implementation, Oct. 6, 2014, pp. 285-300.

Bruno, et al., "Advanced Join Strategies for Large-Scale Distributed Computation", In Journal of the VLDB Endowment, vol. 7, Issue 13, Aug. 1, 2014, pp. 1484-1495.

Dutt, et al., "Plan Bouquets: A Fragrant Approach to Robust Query Processing", In Journal of ACM Transactions on Database Systems (TODS), vol. 41, Issue 2, Article No. 11, Jun. 30, 2016, 37 Pages.

Friedman, Jerome H., "Stochastic Gradient Boosting", In Journal of Computational Statistics and Data Analysis, vol. 38, Issue 4, Feb. 28, 2002, 10 Pages.

Jyothi, et al., "Morpheus: Towards Automated SLOs for Enterprise Clusters", In Proceedings of the 12th USENIX conference on Operating Systems Design and Implementation, Nov. 2, 2016, pp. 117-134.

Lee, et al., "Operator and Query Progress Estimation in Microsoft Sql Server Live Query Statistics", In Proceedings of the International Conference on Management of Data, Jun. 26, 2016, pp. 1753-1764.

Marcus, et al., "Neo: A Learned Query Optimizer", In repository of arXiv:1904.03711v1, Apr. 7, 2019, 18 Pages.

Poess, et al., "New TPC Benchmarks For Decision Support and Web Commerce", In Journal of ACM Sigmod Record, vol. 29, Issue 4, Dec. 1, 2000, pp. 64-71.

Yin, et al., "Bubble Execution: Resource-Aware Reliable Analytics at Cloud Scale", In Journal of the VLDB Endowment, vol. 11, Issue 7, Mar. 1, 2018, pp. 746-758.

Zhu, et al., "Looking Ahead Makes Query Plans Robust: Making the Initial Case with In-Memory Star Schema Data Warehouse Workloads", In Journal of the VLDB Endowment, vol. 10, Issue 8, Apr. 1, 2017, pp. 889-900.

Zou, et al., "Regularization and Variable Selection via the Elastic Net", In Journal of the Royal Statistical Society: Series B, vol. 67, Part 2, Apr. 1, 2005, pp. 301-320.

Office Action Received for European Application No. 20720888.5, mailed on Nov. 20, 2023, 8 Pages.

Notice of Grant Received for Chinese Application No. 202080029797. 1, mailed on Sep. 20, 2024, 2 pages.

Decision to grant a European patent pursuant to Article 97(1) received in European Application No. 20720888.5, mailed on May 3, 2024, 2 pages.

First Office Action received for Chinese Application No. 202080029797. 1, mailed on Feb. 26, 2024, 10 Pages (English Translation Provided).

First Examination Report received for IN Application No. 202117047535, mailed on Dec. 4, 2025, 8 pages.

* cited by examiner

100

200

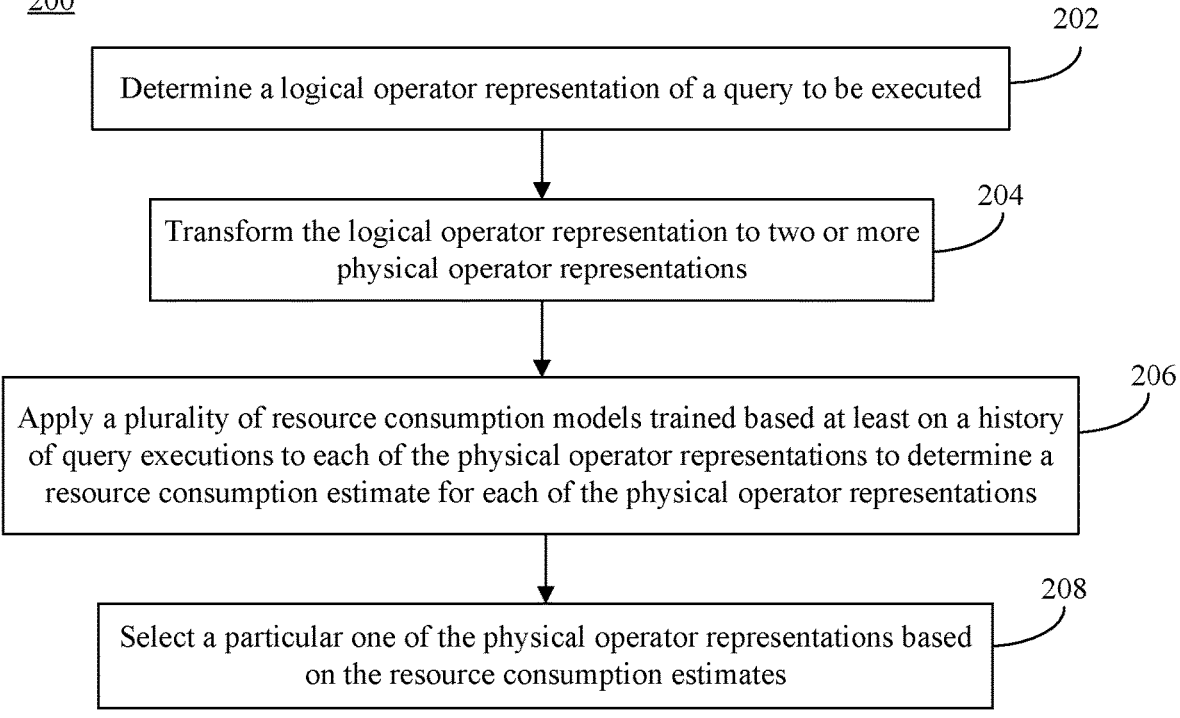

202

Determine a logical operator representation of a query to be executed

204

Transform the logical operator representation to two or more physical operator representations

206

Apply a plurality of resource consumption models trained based at least on a history of query executions to each of the physical operator representations to determine a resource consumption estimate for each of the physical operator representations

208

Select a particular one of the physical operator representations based on the resource consumption estimates

FIG. 2

400
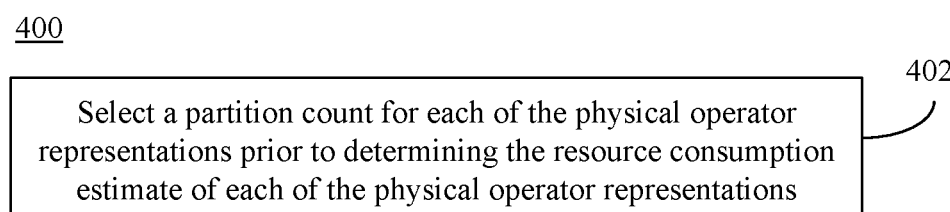
402
Select a partition count for each of the physical operator representations prior to determining the resource consumption estimate of each of the physical operator representations
FIG. 4
500
Apply a combined model generated from the plurality of resource consumption models
502
FIG. 5
600
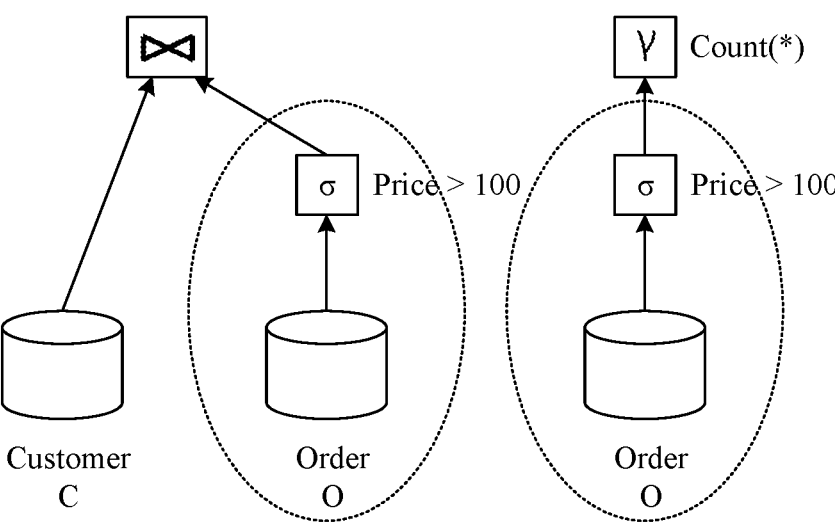
FIG. 6

LEARNED RESOURCE CONSUMPTION MODEL FOR OPTIMIZING BIG DATA QUERIES

CROSS-REFERENCE TO RELATED APPLICATIONS

This application claims priority to U.S. Provisional Patent Application No. 62/840,897, filed on Apr. 30, 2019, titled "Learned Cost Model for Optimizing Big Data Queries," the entirety of which is incorporated by reference herein.

BACKGROUND

A cost-based query optimizer is a crucial component for massively parallel big data infrastructures, where improvement in execution plans can potentially lead to better performance and resource efficiency. The core of a cost-based optimizer uses a cost model to predict the latency of operators and picks the plan with the cheapest overall resource consumption (e.g., the time required to execute the query). However, with big data systems becoming available as data services in the cloud, cost modeling is becoming challenging for several reasons. First, the complexity of big data systems coupled with the variance in cloud environments makes cost modeling incredibly difficult, as inaccurate cost estimates can easily produce execution plans with significantly poor performance. Second, any improvements in cost estimates need to be consistent across workloads and over time, which makes cost tuning more difficult since performance spikes are detrimental to the reliability expectations of cloud customers. Finally, reducing total cost of operations is crucial in cloud environments, especially when cloud resources for carrying out the execution plan could be provisioned dynamically and on demand.

Prior approaches have used machine learning for performance prediction of queries over centralized databases, i.e., given a fixed query plan from the query optimizer, their goal is to predict a resource consumption (e.g., execution time) correctly. However, many of these techniques are external to the query optimizer. In some other instances where optimizer-integrated efforts are used, feedback may be provided to the query optimizer for more accurate statistics, and deep learning techniques may be implemented for exploring optimal join orders. Still, accurately modeling the runtime behavior of physical operators remains a major challenge. Other works have improved plan robustness by working around inaccurate cost estimates, e.g., information passing, re-optimization, and using multiple plans. Unfortunately, most of these are difficult to employ with minimal cost and time overheads in a production cloud environment. Finally, similar to performance prediction, resource optimization is treated as a separate problem outside of the query optimizer, which may result in selecting a query execution plan that is not optimal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for evaluating a resource consumption of a query. A logical operator representation of a query generated to be executed (e.g., obtained from a query generating entity) may be determined. The logical operator representation may be transformed to a plurality of different physical operator representations for executing the query. A plurality of resource consumption models may be applied to each of the physical operator representations to determine a resource consumption estimate for the physical operator representation. The resource consumption models may be trained in different manners based at least on a history of query executions, such that each model may have different granularity, coverage and/or accuracy characteristics in estimating a resource consumption of a query. Based on the determined resource consumption estimates for the physical operator representations, a particular one of the physical operator representations may be selected (e.g., the physical operator representation with the lowest resource consumption).

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a flowchart of a method for selecting a query plan based on resource consumption estimates, according to an example embodiment.

FIG. 4 shows a flowchart of a method for selecting a partition count for physical operator representations prior to determining resource consumption estimates, according to an example embodiment.

FIG. 5 shows a flowchart of a method for determining resource consumption estimates by applying a combined model generated from a plurality of resource consumption models, according to an example embodiment.

FIG. 6 illustrates a common subexpression, consisting of a scan followed by a filter, between two queries, according to an example embodiment.

Figure 1:
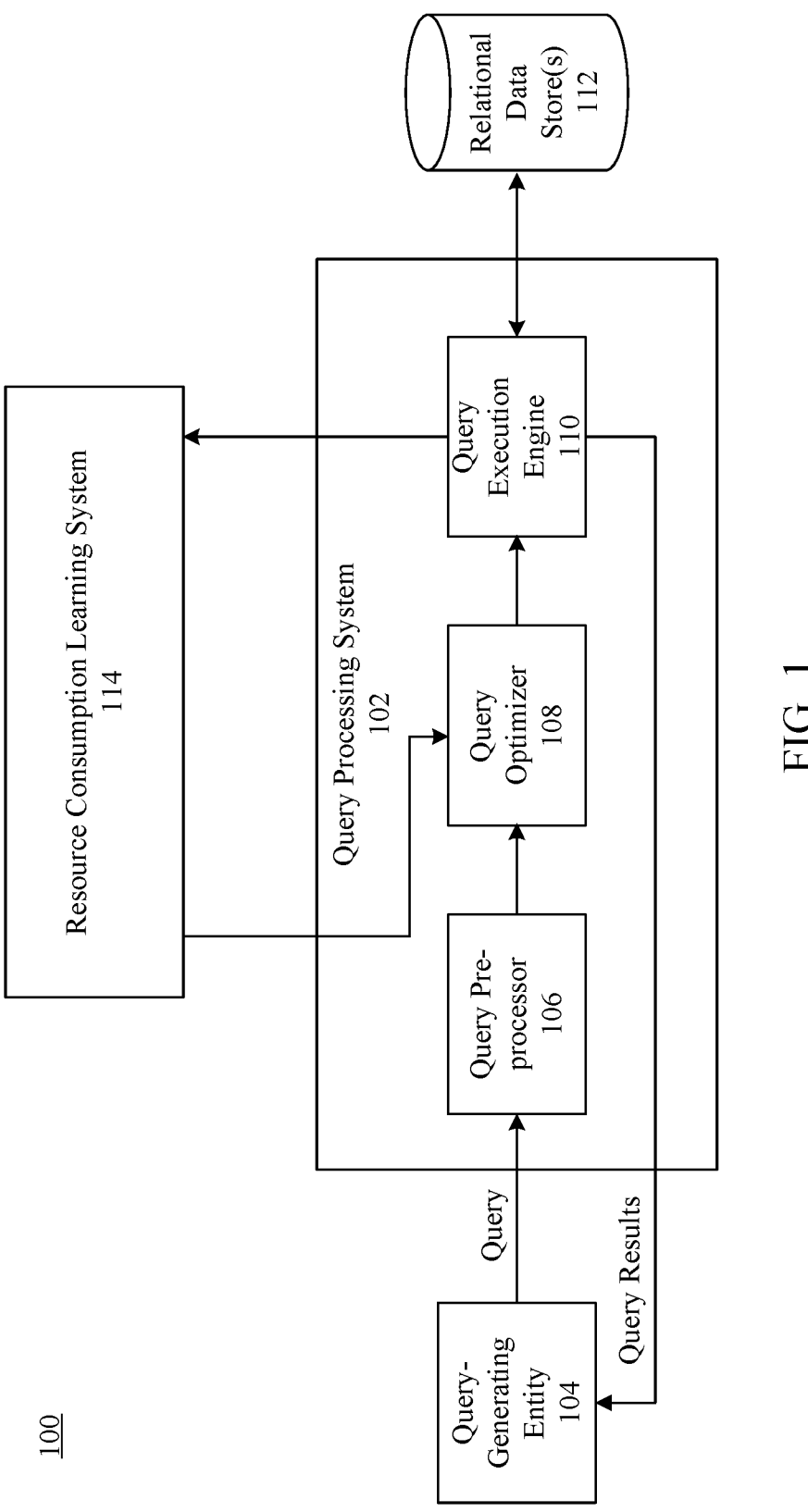
FIG. 1 shows a block diagram of a system for executing a query plan, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

A cost-based query optimizer is a crucial component for massively parallel big data infrastructures, where improvement in execution plans can potentially lead to better performance and resource efficiency. The core of a cost-based optimizer uses a cost model to predict the latency of operators and picks the plan with the cheapest overall resource consumption (e.g., the time required to execute the query). However, with big data systems becoming available as data services in the cloud, cost modeling is becoming challenging for several reasons. First, the complexity of big data systems coupled with the variance in cloud environments makes cost modeling incredibly difficult, as inaccurate cost estimates can easily produce execution plans with significantly poor performance. Second, any improvements in cost estimates need to be consistent across workloads and over time, which makes cost tuning more difficult since performance spikes are detrimental to the reliability expectations of cloud customers. Finally, reducing total cost of operations is crucial in cloud environments, especially when cloud resources for carrying out the execution plan could be provisioned dynamically and on demand.

Prior approaches have used machine learning for performance prediction of queries over centralized databases, i.e., given a fixed query plan from the query optimizer, their goal is to predict a resource consumption (e.g., execution time) correctly. However, many of these techniques are external to the query optimizer. In some other instances where optimizer-integrated efforts are used, feedback may be provided to the query optimizer for more accurate statistics, and deep learning techniques may be implemented for exploring optimal join orders. Still, accurately modeling the runtime behavior of physical operators remains a major challenge. Other works have improved plan robustness by working around inaccurate cost estimates, e.g., information passing, re-optimization, and using multiple plans. Unfortunately, most of these are difficult to employ with minimal cost and time overheads in a production cloud environment. Finally, similar to performance prediction, resource optimization is treated as a separate problem outside of the query optimizer, which may result in selecting a query execution plan that is not optimal.

Embodiments described herein address these and other issues by providing a system for evaluating a resource consumption of a query. In an example system, a logical operator determiner may determine to determine a logical operator representation of a query to be executed. A physical operator determiner may transform the logical operator representation to a plurality of different physical operator representations for executing the query. A resource consumption evaluator may to apply a plurality of resource consumption models to determine a resource consumption estimate for each of the physical operator representations. In implementations, the plurality of resource consumption models may be trained based at least on a history of query executions. Each of the resource consumption models may be trained in different manners, such that each model may have different granularity, coverage, and/or accuracy characteristics in estimating a resource consumption of a query. Based on the determined resource consumption estimates for the physical operator representations, a query plan selector may select a particular one of the physical operator representations.

Evaluating a resource consumption of a query in this manner has numerous advantages, including reducing the resources utilized to execute a query. For instance, by estimating the resource consumption of different physical operator representations for a query to be executed using a plurality of different models, the resource consumption estimates may be determined in a more accurate fashion, enabling a query optimizer to select a particular physical operator representation that utilizes resources in the most efficient manner (e.g., based on the speed at which the query may be executed, the volume of computing resources used to execute the query, etc.). Furthermore, as described in greater detail below, the physical operator representations may also include a partition count associated with each such representation, enabling the query optimizer to take the available resources into account when selecting the appropriate representation to execute the query. In this manner, computing resources may be taken into account during optimization itself, enabling such resources (whether locally or distributed across a plurality of machines) to be utilized more efficiently.

In accordance with techniques described herein, resource consumption models may be trained using learning-based techniques from past workloads which may be fed into a query optimizer during optimization. For instance, learning-based techniques may be employed that harness the vast cloud workloads to learn both accurate and widely applicable resource consumption models based on historical query runtime behaviors. The disclosed techniques entail the learning of a large number of specialized models at varying levels of granularity, accuracy and coverage in a mutually enhancing fashion. The disclosed techniques further learn a meta-ensemble model that combines and corrects the predictions from multiple specialized models to provide both high accuracy and high coverage in determining resource consumption estimates. In implementations, the learned resource consumption models may be integrated within a big data system. The integrated optimizer can leverage learned models not only for resource consumption estimation, but also for efficiently finding the optimal resources, which in many instances can be important for reducing operational costs in cloud environments. Finally, experimental evaluation of the disclosed system demonstrates that the disclosed techniques improve the accuracy of the resource consumption estimates. For instance, it has been observed in some situations that the resource consumption estimates determined by applying the learned resource consumption models may be several orders of magnitude more accurate than other approaches, more correlated with accrual runtimes, and result in both improved latency and resource usage.

Example embodiments are described as follows for systems and methods for evaluating the resource consumption of a query. For instance, FIG. 1 shows a block diagram of a system 100 for executing a query plan. As shown in FIG. 1, system 100 includes a query processing system 102, a query-generating entity 104, one or more relational data store(s) 112, and a resource consumption learning system 114. As shown in FIG. 1, query processing system 102 includes a query pre-processor 106, a query optimizer 108, a query execution engine 110. It is noted that system 100 is described herein merely by way of example only. Persons skilled in the relevant art(s) will readily appreciate that techniques for evaluating a resource consumption of a query to be executed may be implemented in a wide variety of systems other than system 100 of FIG. 1. For instance, system 100 may comprise any number of entities (e.g., computing devices and/or servers or other entities), including those illustrated in FIG. 1 and optionally one or more further devices not expressly illustrated, coupled in any manner. For instance, although query processing system 102, relational data store(s) 112, and resource consumption learning system 114 are shown separate from each other, any one or more of such components (or subcomponents) may be co-located, located remote from each other, may be implemented on a single computing device or server, or may be implemented on or distributed across one or more additional computing devices not expressly illustrated in FIG. 1. System 100 is further described as follows.

In examples, one or more of query processing system 102, query-generating entity 104, relational data store(s) 112, and/or resource consumption learning system 114 may be communicatively coupled via one or more networks, not shown. Such networks may include one or more of any of a local area network (LAN), a wide area network (WAN), a personal area network (PAN), a combination of communication networks, such as the Internet, and/or a virtual network. In an implementation, any one or more of query processing system 102, query-generating entity 104, relational data store(s) 112, and/or resource consumption learning system 114 may communicate via one or more application programming interfaces (API), network calls, and/or according to other interfaces and/or techniques. Query processing system 102, query-generating entity 104, relational data store(s) 112, and/or resource consumption learning system 114 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

Query-generating entity 104 may comprise a device, a computer program, or some other hardware-based or software-based entity that is capable of generating a query to be applied to a relational database. In one embodiment, query-generating entity 104 provides a user interface by which a user thereof can submit the query. In another embodiment, query-generating entity 104 is capable of automatically generating the query. Still other techniques for generating the query may be implemented by query-generating entity 104. The query generated by query-generating entity 104 may be represented using Structured Query Language (SQL) or any other database query language, depending upon the implementation.

In some implementations, query-generating entity 104 may include any computing device of one or more users (e.g., individual users, family users, enterprise users, governmental users, etc.) that may comprise one or more applications, operating systems, virtual machines, storage devices, etc. that may be used to generate a query to be applied to a relational database as described. Query-generating entity 104 may include any number of programs or computing devices, including tens, hundreds, thousands, millions, or even greater numbers. In examples, query-generating entity 104 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Query-generating entity 104 is not limited to a physical machine, but may include other types of machines or nodes, such as a virtual machine. Query-generating entity 104 may interface with query processing system 102 through APIs and/or by other mechanisms. Note that any number of program interfaces may be present.

Query-generating entity 104 is communicatively connected to query processing system 104 and is operable to submit the query thereto. In one embodiment, query processing system 102 comprises a software-implemented system executing on one or more computers or server devices. In some implementations, query processing system 102 may comprise a collection of cloud-based computing resources or servers that may provide cloud-based services for a plurality of clients, tenants, organizations, etc. Generally speaking, query processing system 102 is configured to receive the query from query-generating entity 104, to execute the query against relational data store(s) 112 to obtain data responsive to the query, and to return such data as query results to query-generating entity 104. In one example embodiment, query processing system 102 comprises a version of SQL SERVER®, published by Microsoft Corporation of Redmond, Wash. However, this example is not intended to be limiting, and may include other programs, software packages, services, etc. for executing a query from query-generating entity 104 and providing the results of the query back to query-generating entity 104.

Query pre-processor 106 is configured to receive the query submitted by query-generating entity 104 and to perform certain operations thereon to generate a representation of the query that is suitable for further processing by query optimizer 108. Such operations may include but are not limited to one or more of query normalization, query binding, and query validation. In an embodiment, query pre-processor 106 outputs a logical operator representation of the query. In further accordance with such an embodiment, the logical operator representation of the query may comprise a logical operator tree. As described herein, a logical operator representation may be obtained by translating the original query text generated by query-generating entity 104 into a tree or other hierarchal structure with a root-level operator, one or more leaf nodes representing inputs (e.g., table accesses) and internal nodes representing relational operators (e.g., a relational join operator).

Query optimizer 108 is configured to receive the logical operator representation of the query output by query pre-processor 106 process such representation to generate and select an appropriate plan for executing the query. An execution plan may represent an efficient execution strategy for the query, such as a strategy for executing the query in a manner that conserves time and/or system resources. Generally speaking, query optimizer 108 operates to generate an execution plan for the query by determining a plurality of physical operator representations for the logical operator representation (e.g., by performing query transforms), determines a resource consumption estimate for each physical operator representation through application of a plurality of learning-based resource consumption models, and selects a particular one of the physical operator representations to execute the query based on the determined estimates. In an example embodiment, query optimizer 108 may apply a plurality of learning-based models generated by resource consumption learning system 114, described in greater detail below, to each of the physical operator representations. In examples, query optimizer 108 may be implemented in one or more runtime optimization frameworks as appreciated by those skilled in the art. For instance, query optimizer 108 may be implemented in conjunction with a top-down optimizer, such as a Cascades-style optimizer, or optimizer.

Query optimizer 108 may also be configured to select a partition count for each of the physical operator representations prior to determining the resource consumption estimate for each physical operator representation, such that query optimizer 108 may factor in the number of partitions on which a physical operator representation may be executed during optimization. Based on the determined estimates, query optimizer 108 may select a particular one of the physical operator representations as a query execution plan for executing the query. Further details concerning the resource consumption estimation process will be provided in the following section.

Once query optimizer 108 has generated and selected an execution plan for the query, query optimizer 108 provides the execution plan to query execution engine 110. Query execution engine 110 is configured to carry out the execution plan by performing certain physical operations specified by the execution plan (e.g., executable code) against relational data store(s) 112. Relational data store(s) 112 may comprise a collection of data items organized as a set of formally described tables from which data may be accessed by receiving queries from users, applications or other entities, executing such queries against the relational data store to produce a results dataset, and returning the results dataset to the entity that submitted the query. The performance of such operations described herein results in obtaining one or more datasets from the relational data store(s) 112. Query execution engine 110 may also be configured to perform certain post-processing operations on the dataset(s) obtained from relational data store(s) 112. For example, such post-processing functions may include but are not limited to combination operations (e.g., joins or unions), dataset manipulation operations (e.g. orderby operations, groupby operations, filters, or the like), or calculation operations. Once query execution engine 110 has obtained a dataset that satisfies the query, query execution engine 110 returns such dataset as query results to query-generating entity 104.

Query execution engine 110 may be configured to store or log runtime results associated with query executions for ingestion by resource consumption learning system 114. Resource consumption learning system 114 may train a plurality of resource consumption models, each having a different level of granularity, accuracy and coverage, based on historical query executions. For instance, each resource consumption model may comprise a machine-learning model that is trained based on a feature set associated with the history of query executions, the feature set corresponding to each machine-learning model being weighted differently from one another. In examples, resource consumption models may be trained based on physical operator tree schemas, root operators of physical operator trees, leaf node inputs of physical operator trees, a number of total operators in a physical operator tree, or any combination thereof. Resource consumption models may be trained offline, although implementations are not so limited. As described herein, the resource consumption models generated by resource consumption learning system 114 may be provided to query optimizer 108 during optimization of a query to determine resource consumption estimates such that an appropriate query plan may be selected.

As noted above, query processing system 102 may be implemented on one or more computers. For example, query pre-processor 106, query optimizer 108, and query execution engine 110, or some sub-combination thereof, may be implemented on the same computer. Alternatively, each of query pre-processor 106, query optimizer 108 and query execution engine 110 may be implemented on different computers. Still further, each of query pre-processor 106, query optimizer 108 and query execution engine 110 may be implemented using multiple computers. For example, a distributed computing approach (e.g., in a cloud computing environment) may be used to enable the functions of query optimizer 108 and/or query execution engine 110 to be performed in parallel by multiple computers. Still other implementations may be used.

In one embodiment, query-generating entity 104 and some or all of the components of query processing system 102 are executed on the same computer. In accordance with such an embodiment, the query generated by query-generating entity 104 may be provided to query processing system 102 via a communication channel that is internal to the computer. In an alternate embodiment, query-generating entity 104 is implemented on a device that is separate from the computer(s) used to implement query processing system 102. In accordance with such an embodiment, communication between query-generating entity 104 and query processing system 102 may be carried out over a communication network (e.g., a LAN, WAN, direct connections, or a combination thereof). In one example embodiment, the communications network includes the Internet, which is a network of networks. The communications network may include wired communication mechanisms, wireless communication mechanisms, or a combination thereof. Communications over such a communications network may be carried out using any of a variety of well-known wired or wireless communication protocols.

Query optimizer 108 and resource consumption learning system 114 may operate in various ways to select an execution plan for a query to be executed. For instance, query optimizer 108 and resource consumption learning system 114 may operate according to FIG. 2. FIG. 2 shows a flowchart 200 of a method for selecting a query plan based on resource consumption estimates, according to an example embodiment. For illustrative purposes, flowchart 200, query optimizer 108, and resource consumption learning system are described as follows with respect to FIG. 3.

Figure 3:
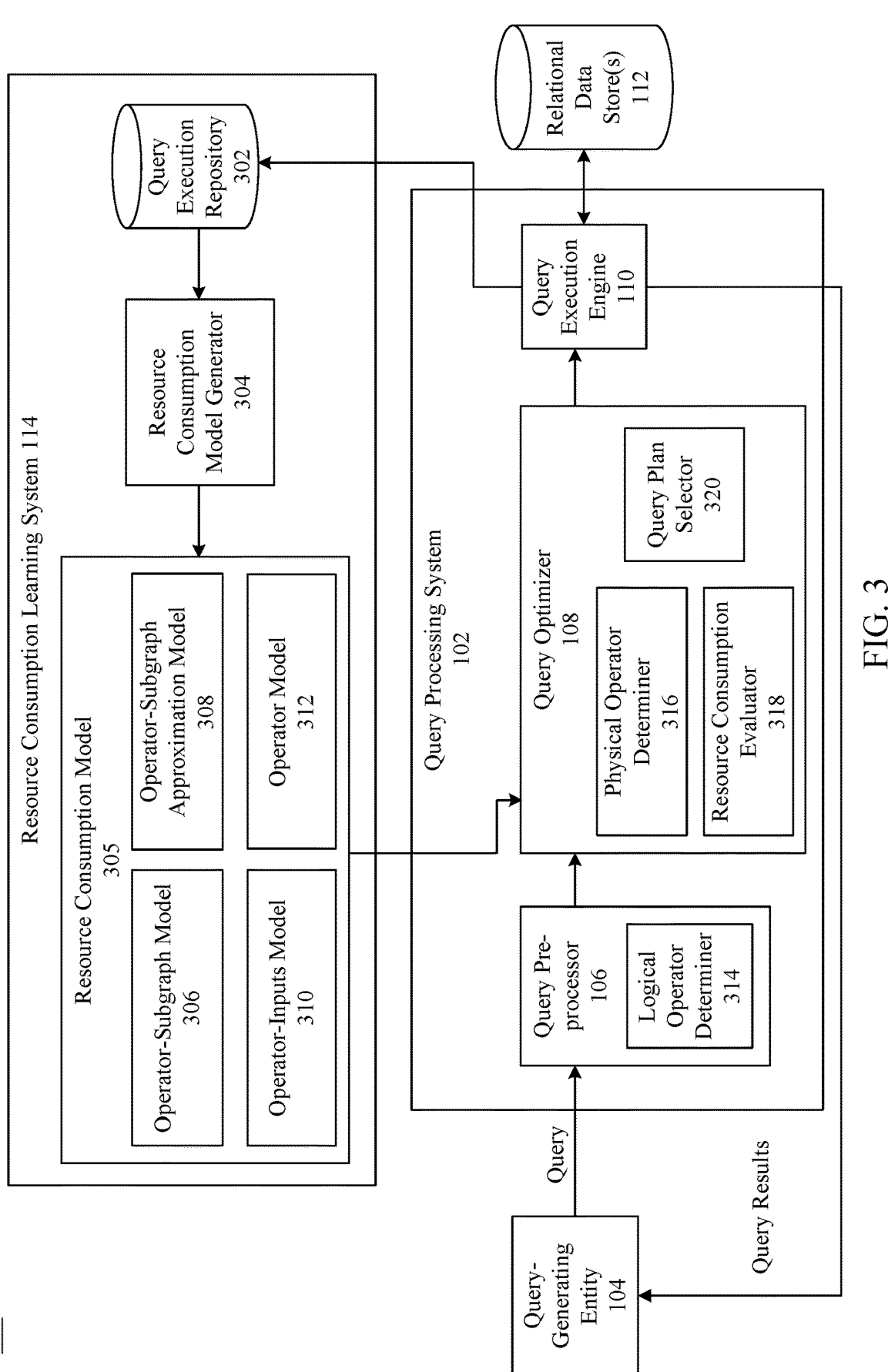
FIG. 3 shows a block diagram of a system for determining a plurality of resource consumption estimates, according to an example embodiment.

FIG. 3 shows a block diagram of a system 300 for determining a plurality of resource consumption estimates, according to an example embodiment. As shown in FIG. 3, system 300 includes an example implementation of query-generating entity 104, query processing system 102, relational data store(s) 112, and resource consumption learning system 114. As shown in FIG. 3, query processing system 102 includes query pre-processor 106, query optimizer 108, and query execution engine 110. Query pre-processor 106 includes a logical operator determiner 314. Query optimizer 108 includes a physical operator determiner 316, a resource consumption evaluator 318, and a query plan selector 320. Resource consumption learning system includes query execution repository 302, resource consumption model generator 304, and resource consumption model 305. Resource consumption model 305 includes an operator-subgraph model, an operator-subgraph approximation model 308, an operator-inputs model 310, and an operator model 312. Flowchart 200 and system 300 are described in further detail as follows.

Flowchart 200 of FIG. 2 begins with step 202. In step 202, a logical operator representation of a query to be executed is determined. For instance, with reference to FIG. 3, logical operator determiner 314 may obtain a query to be executed from query generating entity 104 and determine a logical operator representation of the query. In implementations, logical operator determiner 314 may be configured to generate a logical operator tree, or other representation of the query to be executed. For example, logical operator determiner 314 may execute software instructions to compile or parse an SQL query generated by query-generating entity 104 into a parse tree, a derivation tree, a concrete or abstract syntax tree, etc. Logical operator determiner 314 may also be configured to convert such a tree into another tree, such as a logical operator tree or other algebraic expression representing the query. These examples are not intended to be limiting, and other logical operator representations of the query may be used, such as directed acyclic graphs (DAGs), to represent the relationships between operators.

A logical operator tree determined by logical operator determiner 314 may have a variety of forms, including but not limited to a tree or hierarchy that includes a number of operators (e.g., a root level operator and/or one or more operators below a root level) as well as a plurality of inputs to one or more of the operators in the tree (e.g., leaf node inputs). Furthermore, although logical operator determiner 314 may be configured to output a single logical operator representation in some implementations, such as a preferred logical operator representation, examples are not limited and logical operator determiner 314 may also be configured to output a plurality of equivalent logical operator representations.

In step 204, the logical operator representation is transformed into two or more physical operator representations. For instance, with reference to FIG. 3, physical operator determiner 316 may be configured to obtain the logical operator representation from logical operator determiner 314 and transform the logical operator representation into two or more physical operator representations for executing the query. In example implementations, each physical operator representation may comprise a physical operator tree (or other suitable physical operator representation) that indicates a physical implementation (e.g., a set of physical operators) of a logical operator representation. Each of the determined physical operator representations may comprise, for example, execution plan alternatives corresponding to the logical operator representation. In some implementations, such as where the obtained logical operator representation is a logical operator tree, physical operator determiner 316 may determine one or more corresponding physical operator representations by converting one or more logical operators within the logical operator tree to physical operators.

As will be appreciated by those skilled in the relevant arts, physical operator determiner 316 may transform a single logical operator representation into many different physical operator representations, where each physical operator representation may have a resource consumption. For instance, a join operator in a logical operator representation may be physically implemented as a hash join or a merge join, or another operator that comprises executable code that may enable query execution engine 110 to execute the query.

In some other implementations, physical operator determiner 316 may also be configured to transform one or more logical operators to one or more equivalent logical operators while generating the plurality of physical operator representations, since a physical operator corresponding to a first logical operator may have a different resource consumption than a physical operator corresponding to a second (but logically equivalent) logical operator. In this manner, physical operator determiner 316 may determine a plurality of physical operator representations for the same query to be executed. It is noted, however, that in some implementations, an exploration space may be limited for logical and/or physical transformations of a query (e.g., to reduce a latency).

In step 206, a plurality of resource consumption models that are trained based at least on a history of query executions are applied to each of the physical operator representations to determine a resource consumption estimate for each physical operator representation. For instance, with reference to FIG. 3, resource consumption evaluator 318 may be configured to apply a plurality of models (e.g., two or more of operator-subgraph model 306, operator-subgraph approximation model 308, operator-inputs model 310, and/ or operator model 312) to each of the physical operator representations determined by physical operator determiner 316 to determine a resource consumption estimate for each of the physical operator representations.

Resource consumption estimates associated with each physical operator representation may be an estimate of the time required to process the query based on the physical operator representation, an estimate of an amount of system resources (e.g., processing cycles, communication bandwidth, memory, or the like) that will be consumed when processing the query using the physical operator representation, an estimate of some other aspect associated with processing the query using the physical operator representation, or some combination thereof. Persons skilled in the relevant art(s) will readily appreciate that a wide variety of resource consumption functions (e.g., costs) may be used to generate the resource consumption estimate associated with each physical operator representation. Such cost functions may take into account different desired goals, including but not limited to reduced query processing time and/or reduced system resource utilization.

In examples, one or more of operator-subgraph model 306, operator-subgraph approximation model 308, operator-inputs model 310, and/or operator model 312 may be trained based at least on a history of prior query executions. For instance, upon executing a query pursuant to a selected execution plan, query execution engine 110 may be configured to store runtime information associated with the query execution in query execution repository 302. Query execution repository 302 may comprise a plurality of runtime logs for query executions carried out by query execution engine 110. The runtime information may comprise, for instance, properties of past workloads, statistics of past workloads, cardinality information of past workloads, query execution times, computer resource utilization information (e.g., a number and/or identity of partitions or other computing resources used to execute a query), information associated with a logical and/or physical operator representation of past executed queries (including but not limited to the number and/or identity of operators in such representations), or any other information that may be associated with, extracted from, or otherwise derived from past workloads.

Resource consumption model generator 304 may be configured to generate and/or train each of operator-subgraph model 306, operator-subgraph approximation model 308, operator-inputs model 310, and/or operator model 312 based on a query execution history stored in query execution repository 302. In some implementations, resource consumption model generator 304 may generate and/or train the resource consumption models offline, and fed back into query optimizer 108 during optimization, although implementations are not so limited. For instance, during query optimization, resource consumption evaluator 318 may apply two or more of the resource consumption models to determine a resource consumption estimate for each of the physical operator representations.

In examples, resource consumption model generator 304 may train one or more of operator-subgraph model 306, operator-subgraph approximation model 308, operator-inputs model 310, and/or operator model 312 using the same set of training data (e.g., query execution history stored in query execution repository 302). In some implementations, resource consumption model generator 304 may train the resource consumption models using the same or similar features or feature sets. Feature sets used by resource consumption model generator 304 to train the resource consumption models may include basic features and/or derived features. Basic features may include features extracted from the query that was executed in the past, such as operator information in the query, cardinality information for a particular operator in the query, row sizes that were operated upon, inputs to a workload, parameters of a workload, or other characteristics or statistical information that can be obtained from a previously executed query. Derived queries may include other features, such as features derived from a combination of basic features (e.g., features based on mathematical operations, such as a product, square, square root, deviation, etc.), sizes of inputs and outputs of the workload, execution time of the workload, partition information (e.g., the number and/or identity of partitions utilized to execute the workload, or any other feature that may relate to a contributing factor in the resource consumption of a previously executed query.

In some implementations, each resource consumption model may comprise a machine-learning model that may be trained differently. For instance, each machine-learning model may be trained based at least on a feature set, where the feature set corresponding to each model may be weighted differently from the feature set used to train other machine-learning models. As an illustration, one resource consumption model (e.g., operator-subgraph model 306) designed to be more granular or specialized may comprise relatively higher weights for certain features (and/or weights of zero, or close to zero, for other features), while another model designed to be more generalized (e.g., operator model 312) may weigh features more evenly.

As described above, resource consumption model generator 304 may train a plurality of resource consumption models, including but not limited to operator-subgraph model 306, operator-subgraph approximation model 308, operator-inputs model 310, and/or operator model 312, as shown in FIG. 3. In implementations, operator-subgraph model 306 may comprise a model trained based at least on prior query executions that comprise a physical operator tree with a common schema as a physical operator tree of at least one of the physical operator representations. In other words, operator-subgraph model 306 may be based on prior executions that a similar physical operator tree in certain respects, such as the operators (e.g., same root operator and operators below the root operator), as well as the same type of leaf node inputs (e.g., whether the input is structured or unstructured, the size of the input, location of the source file, the source file type, etc.). By training a model with the same subexpression (excluding particular constants, parameter values and inputs), operator-subgraph model 306 may comprise a model that may have a high accuracy. Because operator-subgraph model 306 may be trained based on the particular schemas, operator-subgraph model 306 may have a reduced coverage, as it may not be applicable to physical operator representations with different schemas. In some implementations, however, operator-subgraph model 306 may be trained based on the most commonly or frequently appearing subgraphs, thereby improving the coverage of such a model.

Operator model 312 may be trained based at least on prior query executions that comprise a physical operator tree with a common root operator as a physical operator tree of at least one of the physical operator representations. For instance, operator model 312 may be trained based on the root-level operator, rather than the operators or inputs beneath the root level. In other words, so long as the root-level operator may comprise the same operator as the physical operator representations determined by physical operator determiner 316, operator model 312 may be applied to determine a resource consumption estimate (even if inputs below the operator may be different). In this manner, operator model 312 may be more widely applicable to determine costs associated with a physical operator representation, although the accuracy may be reduced because contextual information (e.g., information related to the operators and inputs below the root level) may not be present.

In some other implementations, one or more additional models may also be generated, such as operator-subgraph approximation model 308, operator-inputs model 310. Operator-subgraph approximation model 308 may comprise a model trained based at least on prior query executions that comprise a physical operator tree with a common root operator, a common set of leaf node inputs, and a same number of total operators as a physical operator tree of at least one of the physical operator representations. For instance, while operator-subgraph approximation model 308 may be trained based on a common root operator similar to operator model 312, operator subgraph approximation model 308 may also be trained based on other characteristics relating to nodes of a physical operator tree beneath the root level operator. For example, operator subgraph approximation model 308 may also comprise the same type of leaf node inputs (e.g., whether the input is structured or unstructured, the size of the input, location of the source file, the source file type, etc.), as well as a similar overall tree structure (e.g., the same overall number of operator counts as the physical operator representation of the query to be executed). Thus, while the subgraph of the physical operator representation of the query to be executed may be different, operator-subgraph approximation model 308 may nevertheless be applied to estimate a resource consumption for the subgraph. In this manner, the accuracy may be improved relative to operator model 312, while coverage may be improved relative to operator-subgraph model 306.

Operator-inputs model 310 may comprise a model trained based at least on prior query executions that comprise a physical operator tree with a common root operator, a common set of leaf node inputs, and a different number of total operators as a physical operator tree of at least one of the physical operator representations. Thus, while operator-inputs model 310 may be similar to operator-subgraph approximation model 308, operator-inputs model 310 may comprise a different overall operator count (and therefore a different tree structure) than the physical operator representation of a query to be executed, thereby improving the coverage of this model compared to operator-subgraph approximation model 308.

Each of these models are described in greater detail below in Section III.C. It is noted and understood that although it is described herein that resource consumption model generator 304 may train four machine-learning models (operator-subgraph model 306, operator-subgraph approximation model 308, operator-inputs model 310, and operator model 312), implementations are not limited to these particular models, or any particular number of models. Those skilled in the relevant arts may appreciate that other types and quantities of machine-learning models may be implemented, in addition to or as an alternative to those described herein, to achieve a desired combination of coverage and/or accuracy for estimating a resource consumption.

In this manner, resource consumption model generator 304 may train a plurality of models using past workload information and feed those models back into resource consumption evaluator 318 future optimizations. Resource consumption evaluator 318 may obtain the models in various, including via a service or network call, accessing a file, or any other manner as appreciated by those skilled in the relevant arts. During optimization, resource consumption evaluator 318 may apply a plurality (or even all) of the resource consumption models (operator-subgraph model 306, operator-subgraph approximation model 308, operator-inputs model 310, and/or operator model 312) to each of the physical operator representations determined by physical operator determiner 316 to determine a resource consumption estimate (e.g., an execution time) for the physical operator representation. Because the resource consumption models may vary in granularity, accuracy, and/or coverage, applying a plurality of the models to each physical operator representation may enable resource consumption evaluator 318 to determine estimates in a manner that more closely resembles an actual execution time, thereby enabling the selection of an appropriate physical operator representation to execute the query.

In step 210, a particular one of the physical operator representations is selected based on the determined resource consumption estimates. For instance, with reference to FIG. 3, query plan selector 320 may be configured to select a particular one of the physical operator representations from among the plurality of representations determined by physical operator determiner 316 to execute the query. In examples, query plan selector 320 may select a physical operator representation based, at least on, resource consumption estimates determined by resource consumption evaluator 318, such as by selecting the physical operator representation with the lowest or otherwise optimal resource consumption (e.g., the lowest execution time) for executing the query.

Upon selection of a particular physical operator representation, query execution engine 110 may execute a query plan corresponding to the selected representation as described herein. Following execution, query execution engine 110 may also be configured to store runtime information (e.g., runtime logs or the like) associated with the query execution in query execution repository 302 that may be used as training data to further train any one or more of operator-subgraph model 306, operator-subgraph approximation model 308, operator-inputs model 310, and/or operator model 312. As a result, such resource consumption models may be continuously refined based on actual runtime information, enabling resource consumption evaluator 318 to apply those models in a more accurate fashion to better determine resource consumption estimates during query optimization.

As described above, partition counts may also be taken into account during optimization of a query. For instance, FIG. 4 shows a flowchart of a method for selecting a partition count for physical operator representations prior to determining resource consumption estimates, according to an example embodiment. In an implementation, the method of flowchart 400 may be implemented by physical operator determiner 316. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a partition count for each of the physical operator representation is selected prior to determining the resource consumption estimate of each of the physical operator representations. For instance, with reference to FIG. 3, physical operator determiner 316 may be configured to select a partition count for each of the physical operator representations. The partition count may be selected in a number of ways, including based at least on a resource consumption estimate of a portion of each physical operator representation. In other words, the partition count to carry out a physical operator representation may be based on resource consumption estimates (e.g., execution times) for particular stages, operators, nodes, etc. of the physical operator representation.

In example implementations, as will be described in greater detail below in Section III.E, physical operator determiner 316 may be configured to select an appropriate partition count for one or more child nodes (e.g., based on the lowest resource consumption across all of the operators in a given stage). Once physical operator determiner 316 selects a partition count for a particular stage, the same partition count may be selected for other stages for the physical operator representation. Because a given physical operator representation's resource consumption may be strongly intertwined with the partitions (e.g., containers, machines, nodes, virtualized set of resources that may includes a set of processing units, memory, etc.) used to execute the representation, selecting the partition count prior to determining the resource consumption estimate may enable resource consumption evaluator 318 to more accurately determine resource consumption estimates, thereby allowing query plan selector 320 to select a more optimal plan during query optimization. In other words, rather than selecting the appropriate partition count after a query plan has been selected (which may lead to inaccurate resource consumption estimates since the number of partitions can affect how a query is executed), query optimizer 108 may be configured to select the appropriate partition count (or other degree of distributive processing or parallelism relating to the execution of a query) within the optimizer itself to further enhance the performance of the optimizer.

As described above, resource consumption evaluator 318 may be configured to apply a plurality of resource consumption models to determine a resource consumption estimate for a physical operator representation of a query. In some implementations, the plurality of models may be combined into a single model for application by resource consumption evaluator 318. For instance, FIG. 5 shows a flowchart of a method for determining resource consumption estimates by applying a combined model generated from a plurality of resource consumption models, according to an example embodiment. In an implementation, the method of flowchart 500 may be implemented by resource consumption model generator 304, resource consumption model 305, and/or resource consumption evaluator 318. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a plurality of resource consumption models are applied by applying a combined model generated from the plurality of resource consumption models. For instance, with reference to FIG. 3, resource consumption evaluator 318 may be configured to apply resource consumption model 305 that may be generated from two or more of operator-subgraph model 306, operator-subgraph approximation model 308, operator-inputs model 310, and/or operator model 312. In some implementations, resource consumption model 305 may combine a plurality of such models (or any other models not expressly described herein) by weighting each of the models. For instance, resource consumption model 305 may weight any one or more of the models relatively heavier than other models (e.g., to increase coverage, increase accuracy, and/or increase a combination of coverage and accuracy). In example implementations, one or more resource consumption models may be combined into resource consumption model 305 in various ways, as will be described in greater detail below in Section III.D.3.

III. Additional Example Query Optimizer Embodiments

A. Introduction

The following sections are intended to describe additional example embodiments in which implementations described herein may be provided. Furthermore, the sections that follow explain additional context for such example embodiments, details relating to the implementations, and evaluations of such implementations. The sections that follow are intended to illustrate various aspects and/or benefits that may be achieved based on techniques described herein, and are not intended to be limiting. Accordingly, while additional example embodiments are described, it is understood that the features and evaluation results described below are not required in all implementations.

In example query optimizer embodiments, techniques may be implemented by one or more of query processor 106, query optimizer 108, query execution 110, query execution repository 302, resource consumption model generator 304, and resource consumption model 305 (including any subcomponents thereof). Other structural and operational implementations will be apparent to persons skilled in the relevant art(s) based on the following discussion.

As described herein, query optimizer embodiments may employ a learning-based approach to train cost models (e.g., resource consumption models as described above) from past workloads and feed them back to optimize future queries, thereby providing an integrated workload-driven approach to query optimization. Embodiments described herein are capable of harnessing massive workloads visible in modern cloud data services to continuously learn models that accurately capture the query runtime behavior. This not only helps in dealing with the various complexities in the cloud, but also specialize or "instance optimize" to specific customers or workloads, which is often highly desirable. Additionally, in contrast to years of experience needed to tune traditional optimizers, learned cost models are easy to update at a regular frequency. One implementation described herein is used to extend a big data query optimizer in a minimally invasive way. It builds on top learning cardinalities approaches and provides practical industry-strength steps towards a fully learned database system, a vision shared by the broader database community.

Cloud workloads are often quite diverse in nature, i.e., there is no representative workload to tune a query optimizer, and hence there is no single cost model that fits the entire workload, i.e., no-one-size-fits-all. Therefore, embodiments described herein learn a large collection of smaller-sized cost models, one for each of a plurality of common subexpressions that are typically abundant in production query workloads. While this approach may result in specialized cost models that are very accurate, the models may not cover the entire workload: expressions that are not common across queries may not have a model. The other extreme is to learn a cost model per operator, which covers the entire workload but sacrifices the accuracy with very general models. Thus, there is an accuracy-coverage trade-off that makes cost modeling challenging. To address this trade-off, the notion of cost model robustness may be defined with three desired properties: (i) high accuracy, (ii) high coverage, and (iii) high retention, i.e., stable performance for a long time period before retraining. Embodiments described herein follow a two-fold approach towards achieving this objective. First, the accuracy-coverage gap is bridged by learning additional mutually enhancing models that improve the coverage as well as accuracy. Then, a combined model is learned that automatically corrects and combines the predictions from individual ones, providing accurate and stable predictions for sufficiently long window (e.g., more than 10 days). Finally, the learned cost models are leveraged to also consider resources (e.g., number of machines for each operator) in a Cascades-style top-down query optimization to produce both the query- and resource-optimal plans. Various advancements represented by these embodiments are as follows.

The cost estimation problem is motivated from production workloads. Prior attempts for manually improving the cost model are analyzed, and the impact of cardinality estimation on the cost model accuracy is considered.

Machine learning techniques are proposed to learn highly accurate cost models. Instead of building a generic cost model for the entire workload, a large collection of smaller models is learned, one for each common (physical) subexpression, that are highly accurate in predicting the runtime costs.

Accuracy and coverage trade-off in learned cost models are described, the two extremes are shown, and additional models that bridge the gap are discussed. A combined model is learned on top of the individual models that combine predictions from each individual model. The resulting model is robust as it provides both accuracy and coverage improvements by implicitly combining the features from each individual model over a long period. The integration of the optimizer and cost models, including periodic training, a feedback loop from the learning system to the optimizer, and novel query planner extensions for finding the optimal resources (e.g., the appropriate number of partitions) for a query plan are also discussed.

Finally, a detailed evaluation is presented to test the accuracy, the robustness, and the performance of the learned cost models. A case-study is further presented on the TPC-H benchmark and an evaluation over prior production workloads. Overall it was found that learned models improve the correlation between predicted cost and actual runtimes from about 0.1 to 0.8, the accuracy by 2 to 3 orders of magnitude, and led to plan changes that improve both end-to-end latency and resource usage of jobs. It is understood, however, that the example implementation (including evaluation results) are not intended to be limiting.

B. Motivation

This section provides a brief overview of SCOPE and motivates the cost modeling problem from production workloads. This section further shows how the cost model is still a problem even if the intermediate cardinalities in a query plan are fixed. Finally, this section discusses observations derived from production workloads.

1. SCOPE Overview

SCOPE is a big data system used for internal data analytics across the whole of Microsoft to analyze and improve various products, including Bing, Office, Skype, Windows, XBox, etc. It runs on a hyper scale infrastructure consisting of hundreds of thousands of machines, running a massive workload of hundreds of thousands of jobs per day that process exabytes of data. SCOPE exposes a job service interface where users submit their analytical queries and the system takes care of automatically provisioning resources and running queries in a distributed environment.

The SCOPE query processor partitions data into smaller subsets and processes them in parallel on multiple machines. The number of machines running in parallel (i.e., degree of parallelism) depend on the number of partitions, often referred to as partition count of the input. When no specific partitioning is required by upstream operators, certain physical operators (e.g., Extract and Exchange (interchangeably referred as Shuffle)), choose partition counts based on data statistics and heuristics. The sequence of intermediate operators that operate over the same set of input partitions are grouped into a stage—all operators on a stage run on the same set of machines. Except for selected scenarios, Exchange operator is commonly used to reparation data between two stages.

In order to generate the execution plan for a given query, SCOPE uses a cost-based query optimizer based on the Cascades framework. As may be appreciated by those skilled in the relevant arts, the Cascades framework transforms a logical plan using multiple tasks: (i) Optimize Groups, (ii) Optimize Expressions, (iii) Explore Groups, and (iv) Explore Expressions, and (v) Optimize Inputs. While the first four tasks explore candidate plans via multiple transformation rules and reasoning over partitioning, grouping, and sorting properties, embodiments described herein may be implemented as part of the Optimize Inputs tasks. The cost of every candidate physical operator is computed within Optimize Inputs task. In SCOPE, the cost of an operator is modeled to capture its runtime latency, estimated using a combination of data statistics and hand-crafted heuristics developed over many years. Overall, the Cascades framework performs optimization in a top-down fashion, first identifying physical operators higher in the tree, followed by recursively finding physical operators in the sub-tree. After all the sub-tree physical operators are identified and their costs estimated, the total cost of the higher-level operator is computed by combining local cost with the cost of the sub-tree.

Additionally, properties (e.g., sorting, grouping) are propagated via (i) enforcing a required property on a lower level operator that it must satisfy, or (ii) letting an operator derive a property (i.e., derived property) from a lower level operator. In embodiments described herein, the derivation of partition counts are optimized, as partition counts may be an important factor in cost estimation (discussed in Section III.E) for largely parallel data systems, while still reusing the propagation mechanism for other properties. Overall, embodiments described may enable improvements to the cost models with minimal changes to the Cascades framework, using the current cost models in SCOPE as an example.

Although example embodiments are described herein using a Cascades framework, implementations are not so limited. Techniques described herein may be implemented in other query optimizers other than Cascades-style optimizers.

2. Cost Model Accuracy

To analyze the accuracy of the SCOPE cost model, an analysis was conducted of one day of production SCOPE workloads from one of its largest customers, the Asimov system. An extremely low Pearson correlation of 0.04 between the cost estimates produced by the SCOPE cost model and the actual runtime latencies was observed. The ratio of the cost estimates and the actual runtime latencies was also examined A ratio close to 1 would mean that the estimated costs are close to the actual ones. However, as observed, the estimated and actual cost ratio ranges from $10^{-2}$ to $10^3$, indicating a wide mismatch, with both significant under- and significant over-estimation.

The reason for this, as mentioned in the introduction, is the difficulty in modeling highly complex big data systems with virtualized runtime environments, and mixed hardware from disparate vendors. Furthermore, current cost models rely on hand-crafted heuristics and assumptions that combine statistics (e.g., cardinality, average row length) in complex ways to predict each operator's cost (e.g., execution time). The resulting cost estimates are usually way off and get worse with constantly changing workloads and systems in cloud environments. General purpose data processing systems, like SCOPE, further suffer from the widespread use of custom user code that end up as black boxes in the cost models.

Manual Tuning.

Improving a cost model might be achieved by considering newer hardware and software configurations, such as machine SKUs, operator implementations, or workload characteristics. The SCOPE team did attempt this path and put in significant efforts to improve their default cost model. The resulting cost model is available for SCOPE queries under a flag. This flag was turned on the costs from the improved model were compared with the default one. Results over the same workload were observed. It was observed that the correlation improves from 0.04 to 0.10 and the ratio curve for the manually improved cost model shifts slightly upwards, i.e., it reduces the over-estimation. However, it still suffers from the wide gap between the estimated and actual costs, again indicating that cost modeling is non-trivial in these environments. For purposes of the remainder of this description, the default SCOPE cost model is therefore used.

Feeding Back Actual Cardinalities.

In accordance with previous work, a learning approach was taken to improve cardinalities in big data systems. The question is whether fixing cardinalities also fixes the cost estimation problem. To address this, the actual runtime cardinalities, i.e., the ideal cardinality estimates that one could achieve, were fed back and compared to the resulting cost estimates. It was observed that fixing cardinalities improves the correlation and shifts the ratio curve up a little, due to less over-estimation, but there is still a wide gap between the estimated and the actual costs. This is because even with the actual cardinalities, the heuristics and the formulae used for cost estimation remain the same and still do not mirror the actual run-time characteristics. It is noted that while improving the cardinality estimate is still important, especially for resource estimation in a job service environment, improving cost estimates is a complementary effort towards building a learning optimizer.

3. System Observations

In developing the embodiments described herein, a goal was to learn accurate cost models that could be integrated within the SCOPE job service for query optimization. To ensure the practicality of the approach, certain observations gathered from a production environment are now discussed. These observations are not intended to limit the systems in which techniques may be implemented, but are rather provided only for illustrative purposes in the context of an example implementation.

R1. Accurate Runtime Predictions:

Predictions from the learned cost model should be close to the actual runtimes. Learning accurate predictions automatically make the cost model highly correlated, thereby leading to better execution plans.

R2. Non-Invasive:

It is desirable to reuse the search strategy, including the transformation rules and the properties propagation, and only leverage the learned cost models for predicting the costs of operators. Therefore, the learned model should be implementable within existing query optimization frameworks.

R3. Compile Time Features:

Learned cost models can only use compile time features and their derivatives. Runtime features or sample runs may not feasible in current production environments.

R4. Full Coverage:

It is erroneous to mix and match the learned and the default cost estimates, and therefore the learned models should cover the entire workload and remain applicable for a substantial time window before they need retraining.

R5. Fair Amount of Interpretability without Compromising on Robustness:

Models that are interpretable enough for debugging purposes are desired, but at the same time allow for accurate results.

C. Learned Cost Models

This section will first highlight key challenges in learning the cost models and then present an approach of learning a large set of specialized models in accordance with embodiments. Subsequent sections will refine and consider various aspects of this approach.

1. Challenges

One simple approach is to learn a "humongous" model with all possible features and invoke it repeatedly during query optimization. Such a model, however, suffers with huge error, since the behavior of operators differ significantly from each other. For the same reason, even traditional query optimizers model each operator (e.g., a hash group by operator or a merge join operator) separately, and then combine the costs from individual operators to compute the overall execution cost. Furthermore, even for the same operator, one cost model may not be sufficient to capture all possible scenarios. This is because the behavior of the same operator may vary depending on the context (it appears with, e.g., interactions with other operators in the query through pipelining, sharing of sorting, and grouping properties, as well as well as the underlying software or hardware platform it runs on. This issue may be referred to as the heterogeneity problem. Apart from the heterogeneity, learning cost models from previous query executions carries the risk of over-fitting to the specific patterns or statistics that may not be applicable to the larger workload or for a long period of time. Finally, it may also be advantageous that the learned models jointly find the optimal resources (particularly the number of machines) as well as the cost, making the integration with existing resource-agnostic query optimizers challenging.

Below, an approach to address the heterogeneity challenge in accordance with an embodiment will be discussed. Thereafter, the over-fitting challenge will be discussed in Section III.D, and finding the joint optimization challenge to find the optimal partition counts in Section III.E.

2. Specialized Cost Models

In shared cloud environments, a large portion of the analytical queries are recurring, i.e., the same business logic is applied to newer instances of the datasets that arrive at regular intervals (e.g., daily or weekly). Due to the shared inputs, these recurring jobs often end up having one or more common subexpressions across them. For instance, more than half of SCOPE jobs are recurring in nature, with most of them appearing daily, and as high as sixty percent having common subexpressions between them. FIG. 6 illustrates a system that includes a common subexpression, consisting of a scan followed by a filter, between two queries, according to an example embodiment.

Embodiments described herein may exploit these common subexpressions by learning a large number of specialized models, one for each such operator-subgraph. While this is similar to learning cardinalities, cardinalities is a property of the logical tree, and cost is a property of the physical tree. Therefore, embodiments learn a model for each physical operator root of the operator-subgraph template and consider physical properties such as partition count.

Learning operator-subgraph models has a number of advantages. First, the behavior of an operator can change based on what operators have executed before it on the same machine. For example, the execution time of an operator can differ depending on whether it is running in a pipelined manner (i.e., simultaneously), or is blocked until the completion of the prior operators. In operator-subgraph, this is modeled by learning the behavior of each physical operator conditioned on the operators beneath it in the query plan, thereby capturing the context for the operator.

Second, the estimation errors of statistics (e.g., cardinality) tend to grow exponentially as one moves up the query plan, with each operator building upon the errors of its children operators. However, in subgraphs, operator costs depend more on the leaf level inputs since the intermediate subexpression is fixed. In other words, different variations of the subgraphs will have different models. Furthermore, when the feature values or statistics may be inaccurate, the subgraph models can partially mitigate the damage by adjusting the weights of features or statistics such that the cost predictions are closes to actual (discussed subsequently in Section III.C.2.II). This is further facilitated by the fact that for recurring jobs, inputs typically share a similar data distribution and characteristics even as the size of data differ over time, and thus corrections to weights often generalize over future job invocations. In other words, learned models can make accurate predictions even when the feature values are not accurate. This is in contrast with the default models, where the weights are configured assuming that the statistics are accurate.

Finally, the recurring or overlapping jobs often execute over similar platforms since they are issued by users performing similar tasks, or belonging to the same business group, and thus share hardware or software characteristics (e.g., buffer size, disk speed, cache, RAM). These characteristics typically remain stable over a short duration, and thus, as is shown in Section III.F, a model trained once can make sufficiently accurate predictions. Moreover, operator-subgraph models lead to a high correlation (e.g., more than 0.9) between predicted cost and actual runtime (see Section III.F) a substantial improvement over the correlation in the default cost model (e.g., around 0.1). As in any machine learning approach, two problems should be addressed, namely the feature selection and the model selection. These are discussed in greater detail below.

I. Feature Selection

The features used for learning the specialized operator-subgraph models are now described. A variant of elastic net is used as the learning model since it offers the best performance, as described in the next section. For feature analysis, the feature weights of the models over one day of training data will be considered. Table 1 depicts the basic features, while Table 2 depicts the features derived by combining one or more basic features. These are described below. Features in these tables are only illustrative. Implementations may use a set of features less than those described below, or may contain additional features not expressly described.

TABLE 1

| Basic Features | |
| --- | --- |
| Feature | Description |
| Input Cardinality (I) | Total Input Cardinality from children operators |
| Base Cardinality (B) | Total Input Cardinality at the leaf operators of subgraph |
| Output Cardinality (C) | Output Cardinality from the current operator |
| AverageRowLength (L) | Length (in bytes) of each tuple |
| Number of Partitions (P) | Number partitions allocated to the current operator |
| Parameters (PM) | Parameters |
| Input (IN) | Inputs |
| Sqrt (Input Cardinality) (sqrt(I)) | Square root of input cardinality |
| Sqrt (Base Cardinality) (sqrt(B)) | Square root of base cardinality |

TABLE 2

| Derived Features | |
| --- | --- |
| Category | Features |
| Input/output data size | $L*I$, $L*B$, $L*\log(B)$, $L*\log(I)$, $L*\log(C)$ |
| Combined input-output data | $B*C$, $I*C$, $B*\log(C)$, $I*\log(C)$, $\log(I)*\log(C)$, $I*C$, $\log(B)*\log(C)$ |
| Data per partition/ machine | $I/P$, $C/P$, $I*L/P$, $C*L/P$, $\text{sqrt}(I)/P$, $\text{sqrt}(C)/P$, $\log(I)/P$ |

The basic features include, but are not limited to: the cardinality, the average row length, the number of partitions, the parameters, and the inputs to the sub-graph. Three kinds of cardinalities are considered: 1) base cardinality: the total input cardinality of the leaf operators in the subgraph, 2) input cardinality: the total input cardinality from the children operators, and 3) output cardinality: the cardinality output from the current operator. Besides the basic features, additional features are also considered that are formed via combinations of basic features. They are also classified into three categories. The first category contains features where cardinalities are multiplied with the row length to capture the amount of data read, written, or transferred over the network. In the second category, the product of input or base cardinalities with the output cardinalities are further considered, together covering the data processing and network communication aspects. The third category captures the amount of data processed per machine and is unique to parallel big data systems. Typically, partitions of data are processed in parallel with each machine often handling one or more partitions of data, with all operators belonging to the same stage sharing the same number of partitions. Thus, the features in the third category capture the per-machine input and output cardinality, as well as per machine input and output partition size.

Like cardinality, the number of partitions or machines is also estimated by the optimizer. However, as described in detail in Section III.E, the main challenge is that the number of partitions (and thus the number of machines) is solely decided by the partitioning operators (e.g., Exchange and Extract) without assessing the impact on the cost of other operators on the stage. This can result in sub-optimal performance for the stage. Query planning extensions for jointly finding the optimal cost and partitions are discussed in Section III.E. Note that features such as job name or cluster name are intentionally ignored, since they could induce strong bias and make the model brittle to the smallest change in names II. Choice of Learning Model A number of machine learning models were evaluated: linear-regression, support-vector-machine, neural-networks, decision tree, and their variants over the production workloads (discussed in Section III.F.1), and it was found that most of these machine learning models perform better than the default cost models. In particular, both linear- and decision tree-based regression models performed reasonably well and can be used interchangeably. It will be appreciated to those skilled in the art that other machine-learning models may also be used to implement techniques described herein. Below, some of the considerations in model selection are discussed.

Fewer and Noisy Training Examples.

The accuracy of a learned model may depend on the availability of sufficient training data. While the overall training data can be large, it was observed that for many operator-subgraph templates, the number of training examples is highly non-uniform, with many subgraphs having fewer training examples (e.g., more than half of the subgraph instances have <30 training samples for the workload described in Section III.B). Additionally, given the variance in cloud environments (e.g., failures), training samples can have noise in their class labels (i.e., execution times of past queries) as well as features (e.g., inaccurate statistics). Both these factors together make the over-fitting problem challenging. In fact, for these reasons, it was found that neural network model as well as ensemble models such as gradient-boost and random forest do not lead to significant improvements compared to their non-ensemble variants (Section III.F.1).

Elastic Net.

A variant of elastic net was used. Elastic net is a regularized linear regression model that combines L1 and L2 regularization to automatically vary the complexity (i.e., features and weights) of a model depending on the subgraph and available training samples. Although the features and weights over small and noisy training data tend to change significantly, the combined L1 and L2 regularization tends to address this by making the changes more stable, thereby leading to smoother predictions. Often the number of candidate features (25 to 30 in number) are as many as the number of training samples. However, for a given subgraph, only a select few features are usually informative. These informative predictors further tend to differ across different subgraph instances. Naturally, it is almost impossible to keep track of relevant predictors for each subgraph instance separately. Elastic net, appropriately, helps perform automatic feature selection, by selecting a few informative predictors for each subgraph independently. Thus, all subgraphs are trained with the same set of features, and elastic net is permitted to select the relevant ones. Finally, the elastic net model is intuitive and easily interpretable, like the default cost models which usually are the weighted sum of a number of statistics. This is one of the important requirements (as discussed in Section III.B), and a prerequisite for effective debugging and understanding the execution behaviors of production jobs. The experiments over production workloads (see Section III.F) show that elastic net models are accurate, have low storage footprint, and are fast to invoke during query optimization. The low storage footprint indeed makes it feasible to learn specialized models for each possible subgraph (see R1 and R5 in Section III.B.3). While operator-subgraphs may lead to specialized cost models for common subexpressions, models are still lacking for subgraphs that are not frequent (e.g., at least 5 occurrences) in the training data. Additionally, since the number of training samples are often fewer in number, the predicted costs may not be representative. Below, an approach to addressing this problem is discussed.

D. Robustness

Building robust cost models, as discussed in Section III.A (i.e., models that are not just accurate but also cover the entire workload and remains applicable for a substantial time before getting retrained), will now be discussed in greater detail. Earlier techniques on robust query processing either make changes to the plan during query execution, or execute multiple plans for the same query simultaneously, thus incurring additional overhead. In contrast, embodiments aim to leverage the massive cloud workloads to learn models in advance (e.g., in an offline manner) such that one robust plan can be generated during query optimization.

This section will first explain the coverage and accuracy tradeoff for the operator-subgraph model. Then, this section will discuss the other extreme, namely an operator model, and introduce additional models to bridge the gap between the two extremes. Finally, this section will discuss combining the individual models to achieve robustness.

1. Accuracy-Coverage Tradeoff

One Extreme: Operator-Subgraph Model.

The operator-subgraph model (e.g., operator-subgraph model 306 described herein) presented in Section III.C may be highly specialized in implementations, since it captures the context below an operator for query subgraphs that are seen repeatedly in the query workload. As a result, this model is likely to be highly accurate. At the same time, the operator-subgraph model may not generalize well to subgraphs not appearing repeatedly in the training dataset and therefore may cover only a limited part of the workload, i.e., low coverage (See Sections III.F.1 and III.F.2 for accuracy and coverage over production workloads). Thus, it may be difficult in some instances to predict cost for arbitrary query plans consisting of subgraphs never seen in training dataset.

The Other Extreme: Operator Model.

In contrast to the operator-subgraph model, a model for can be learned for each of the physical operators, similar to how traditional query optimizers model the cost. The operator models (e.g., operator model 312 described herein) can be used to estimate the execution latency of a given query by composing the costs in a hierarchical manner akin to how default cost models derive query costs from the costs of individual operators. Naturally, the operator model can be used to estimate costs for any arbitrary query, i.e., it covers the entire workload, however, similar to traditional query optimizers, it may suffer from decreased accuracy in some instances since the behavior of an operator changes based on what operations appear below it. In fact, it can be difficult to learn a single model that captures all instances of an operator. Furthermore, the estimation errors in the features or statistics at the lower level operators of a query plan are propagated to the upper level operators that can degrade the final prediction accuracy. Thus, an accuracy and coverage tradeoff can be observed when learning cost models, with operator-subgraph and operator models being the two extremes of this tradeoff. As noted, the operator-subgraph and operator models are referred to as extremes in one example embodiment. Other models may also be trained and utilized as will be appreciated by those skilled in the art.

2. Bridging the Gap

Two alternative cost models are also described that fall in between the two extreme models in terms of the accuracy-coverage trade-off that was discussed above.

Operator-Input Model.

An alternative (or in addition) to per-operator is to learn a model for all jobs that share similar inputs. Similar inputs also tend to have similar schema and similar data distribution even as the size of data change over time. Thus, the behavior of operators learned over similar inputs often generalize over future job invocations. In particular, a model (e.g., operator-inputs model 310 described herein) is created for each operator and input template combinations. An input template is a normalized input where the dates, numbers, and parts of names that change over time are ignored for the same recurring input. This helps to group jobs that run on the same input schema over different days. Furthermore, the intermediate subgraph is featured by introducing two additional features. The first feature counts the number of logical operator in the subgraph, while the second feature counts the depth of the physical operator in the sub-graph.

Operator-subgraphApprox Model.

While subgraph modeling exploits the overlapping and recurring nature of big data analytics, it has been observed that there are a large number of jobs with subgraphs that are similar to each other, but not exactly the same. Thus, a model (e.g., operator-subgraph approximation model 308 described herein) can be learned for jobs that share similar input as well as have the same approximate underlying subgraph. Two subgraphs may be considered to be approximately the same if they have the same physical operator at the root and consist of the same frequency of each logical operator in the underneath subgraph. The notion of sub-graph similarity has been kept course-grained (e.g., a frequency of logical operators instead of physical operators is used, ordering between operators may be ignored), in order to effectively group similar subgraphs to address the heterogeneity problem without substantially reducing the coverage. Note that the operator-subgraph model already groups subgraphs using more strict similarity notions (e.g., capturing ordering among operators). As such, Operator-subgraphApprox may be a hybrid of the operator-subgraph and operator-input model and may capture the characteristics of both models: it can achieve higher accuracy compared to the operator or operator-input models, and more coverage compared to the operator-subgraph model.

Figure 7:
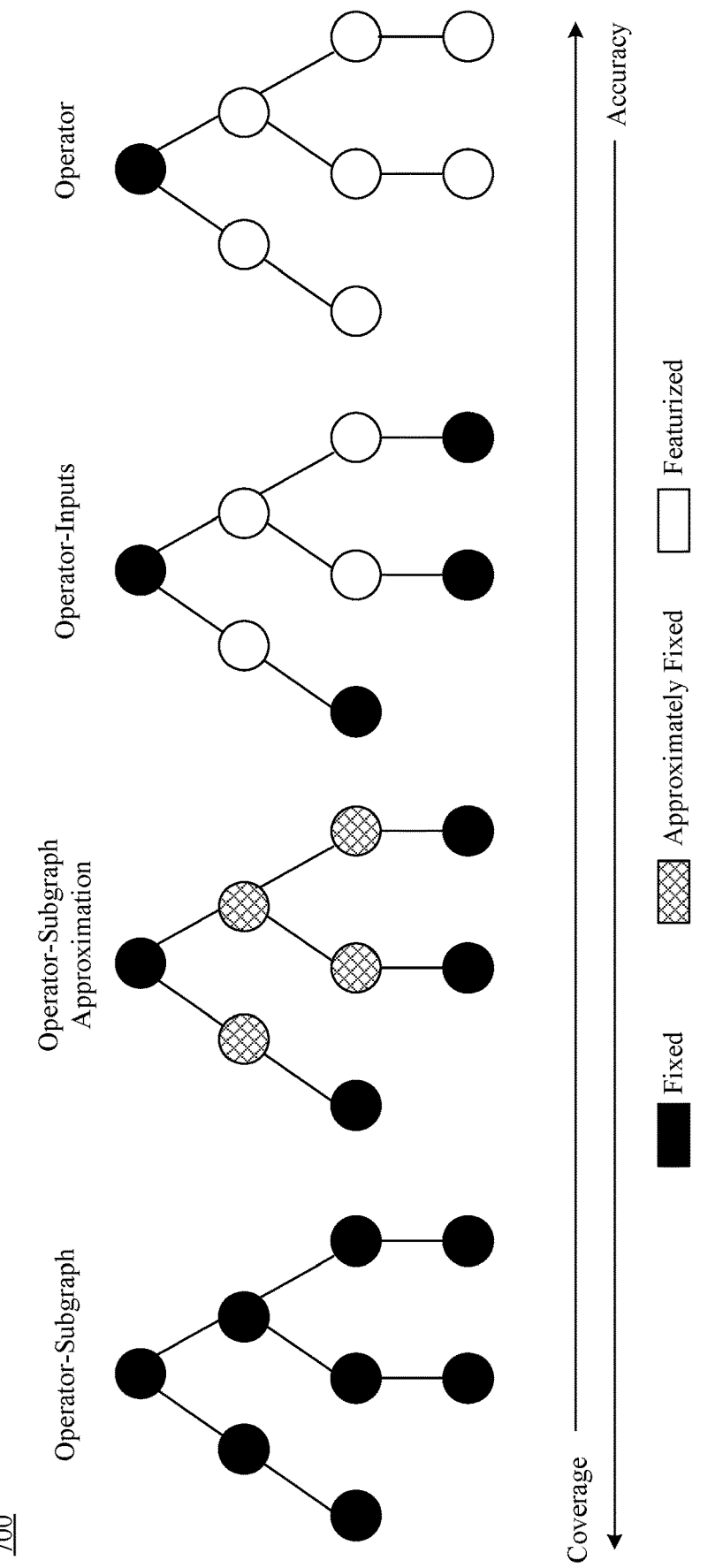
FIG. 7 illustrates different learning granularities for bridging a gap between model accuracy and workload coverage, according to an example embodiment.

FIG. 7 illustrates the four different learning granularities for bridging a gap between model accuracy and workload coverage that have been discussed so far, according to an example embodiment. From left to right, the model accuracy decreases while the coverage over the workload increases. In embodiments, feature or attribute weights may be varied for each of these models. For instance, the weight for specialized models, like the operator-subgraph model, may be concentrated on a few features while the weights for more generalized models, like the per-operator model, may be more evenly distributed. Given the multiple learned models, with varying accuracy and coverage, a determination may be made as to which model (or models) to use and when. A manner of addressing this determination will now be discussed.

3. The Combined Model

One way to select a learned model to use is to adopt a rule-based approach that looks for the presence of learned models in decreasing order of specialization, starting from operator-subgraphs to operator-subgraphApprox to operator-inputs to operators. However, picking the models in this way is not always effective. For example, even though operator-subgraph has the best performance in general, there are instances, especially with insufficient training data, where these models give poor performance due to over-fitting. An improvement is to choose a threshold in terms of accuracy over validation data to decide which model to use for a given subgraph. However, it is cumbersome and can be infeasible in some instances to decide one specific threshold to switch from one model to another that works (i) equally well for all subgraphs, and (ii) over a long prediction window. Moreover, if a model x has a lower overall training accuracy than model y, there may still be some class of queries where model x performs better than y and vice-versa. This could be because of factors such as missing one or more informative features, or noise in feature values or class labels. In reality, the feature space over which the different models perform well is difficult to separate using a threshold or rule, nor is it always feasible to keep track of sub-spaces where each model performs better.

Through an analysis of over more than 42K operator instances from production workloads, the accuracy and coverage of different individual models was observed. In the observation, for operator-subgraph models, it was seen that for the operators that had learned models, cost-predictions are mostly accurate. Operator models, on the other hand, had relatively more error than the operator-subgraph models. Operator-input have more coverage with marginally more error compared to operator-subgraphs. However, for some instances, it was noticed that the operator-input model perform better than the operator-subgraph model. This is because operators falling in those regions had much fewer training samples resulting in the over-fitting problem for operator-subgraphs. The operator-input model, on the other hand, had more training samples, and thus was observed to have performed better in examples.

Learning a Meta-Ensemble Model.

Figure 8:
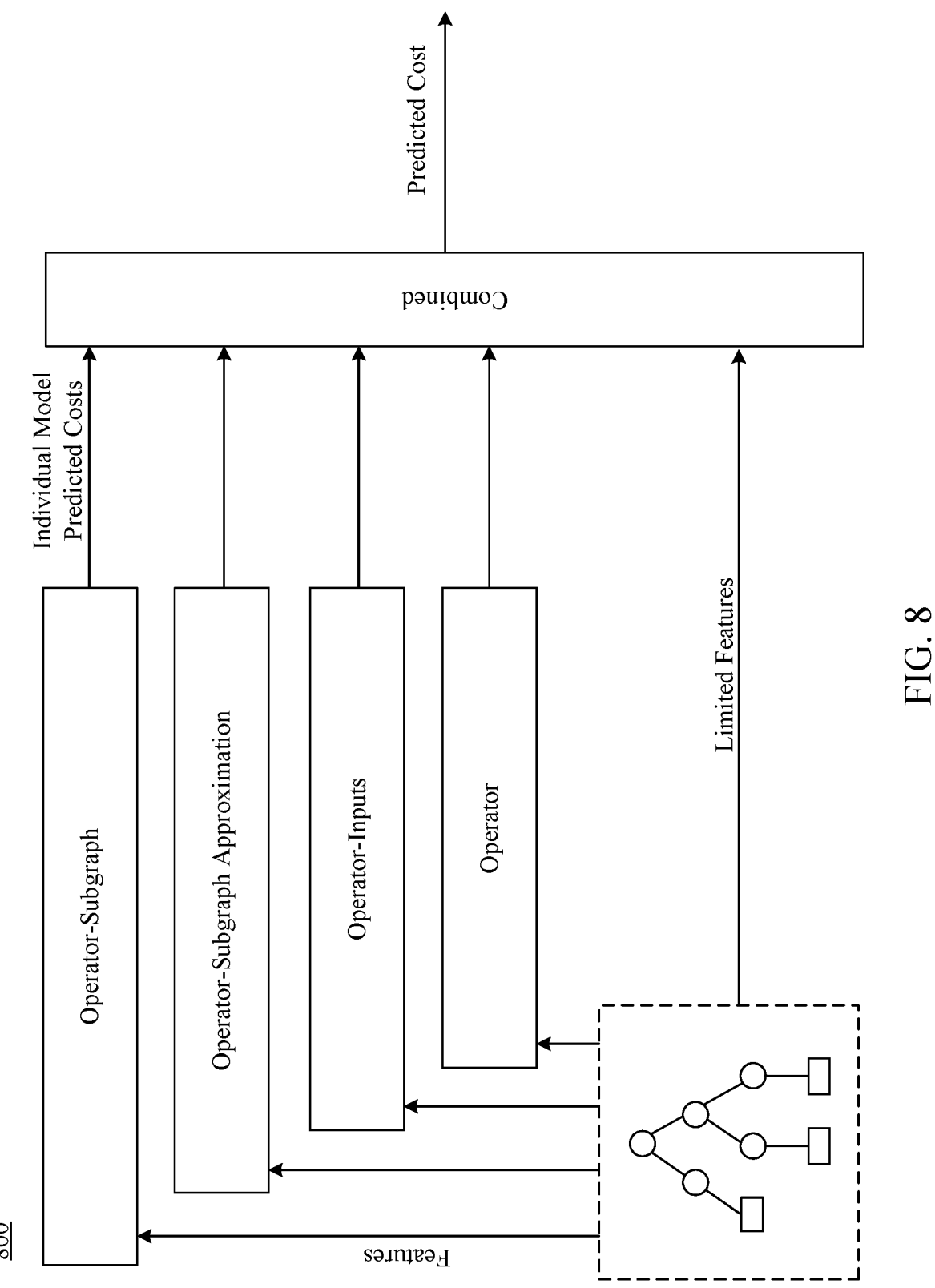
FIG. 8 shows an interaction among learned models to generate a combined model for predicting a query execution cost, according to an example embodiment.

A meta-ensemble model is introduced that uses the predictions from specialized models as features (i.e., meta features), along with additional features: (i) cardinalities, (ii) cardinalities per partition, and (iii) number of partitions to output a corrected or predicted cost, as illustrated in FIG. 8. For instance, FIG. 8 shows an interaction among learned models to generate a combined model (e.g., resource consumption model 305) for predicting a query execution cost, according to an example embodiment A number of machine learning models were evaluated as a meta-learner in example production workloads (Section III.F.1), and it was found that FastTreeRegression leads to greater accurate cost predictions.

FastTreeRegression is a variant of the gradient boosted regression trees that uses an efficient implementation of the MART gradient boosting algorithm. FastTreeRegression builds a series of regression trees, with each successive tree fitting on the residual of trees that precede it. Each tree recursively partitions the space defined by the predictions from individual models (and raw features) to create fine-grained sub-spaces. Within each subspace, FastTreeRegression outputs either (i) either the prediction from one of the individual models, or (ii) learns a new prediction depending on the feature values. In short, FastTreeRegression is able to learn the complex dependencies between the individual model predictions, additional feature values, and operator's actual runtime behavior without using explicit binning or thresholds.

Benefits.

The benefits of FastTreeRegression below are summarized below.

(1) Effective characterization of space where each model performs well. Each individual model is capable of learning some part of the problem but may not learn the whole space. The combined model, however, can explore a space of individual learned models, and has the ability to (i) select and discredit models based on the accuracy of their predictions, and (ii) correct or combine predictions from one or more models to predict more accurate costs. It was observed that a combined model, as shown in FIG. 8, may be configured to capture the advantageous characteristics across all models.

(2) Robustness to noise and outliers. The combined model makes use of sub-sampling to build each of the regression trees in the ensemble, making it resilient to noise in class labels (e.g., execution times of prior queries). In some instances, it was observed that combined models performed better. Moreover, it was noticed that the influence of error in feature values varies across models, and the combined model may be configured to select the model that is least influenced by erroneous features. This is because specialized models may weigh the same feature differently depending on the granularity of their learning. For example, for a given operator if the cardinality estimates are erroneous, the combined model may prefer predictions from operator-subgraph or operator-input models that rely more on base cardinalities (less erroneous than operator cardinalities). Thus, errors incurred by one model due to noise in features can be compensated by the predictions of other learners in the combination. This also leads to lower variance and more smooth and stable predictions compared to individual models.

(3) Full coverage with high accuracy. The combined model may be capable of covering all possible plans, since it uses operator model as one of the predictors. Most importantly, the combined model generally may have increased accuracy compared to the operator model and has comparable predictions to those of specialized models. Moreover, when specialized models overfit due to lack of sufficient training samples, the combined model identifies and improves such predictions, providing better accuracy than specialized models.

(4) Extensibility. The combined model may be flexible enough to incorporate additional models or features or replace one model with another. Including the default cost model was also tried. However, on SCOPE, adding the default cost model to the ensemble did not result in the improvement of performance.

Limitations.

A downside with the FastTreeRegression is that the predictions are difficult to interpret. While there have been recent efforts to make ensemble models more interpretable, they can add more complexity to the system in some implementations. In these embodiments, the combined model builds on top of multiple linear models, which in turn are interpretable. So, for simplicity, the contribution of features to the overall cost for each of the individual models is shown separately. Indeed, this approach does not capture the interactions of features across models, but still provides sufficient insights for debugging.

E. Optimizer Integration

This section describes a two-fold integration of the learned cost models discussed herein with the SCOPE query optimizer: (i) feeding back learned cost models and looking them up, instead of the default ones, during query optimization, and (ii) extending the query planner for resource-aware optimization using the learned cost models.

1. Feedback and Lookup

In example embodiments, training models may be carried out based on the past workload trace for each cluster. It was observed that a training window of two days and a training frequency of every ten days provides reasonably good accuracy and coverage (Section III.F), although these time periods are not intended to be limiting in any way. In particular, each of the four individual models may learn independently on the first day, and use their predictions, along with other features, to learn the combined model on the second day.

Once the models are trained (e.g., by resource consumption model generator 304), the models may be provided as feedback to the optimizer, as described herein. Thus, in accordance with examples described herein, one or more of operator-subgraph model 306, operator-subgraph approximation model 308, operator-inputs model 310, operator model 312, and/or a combined model (e.g., resource consumption model 305) may be provided as a feedback to optimizer 108. In embodiments, the models may be serialized and served either from a text file, using an additional compiler flag, or using a web service that is backed by a SQL database. All models relevant for a cluster may be loaded upfront, into a hash map, to avoid expensive lookup calls during query optimization. The keys of the hash map may be identifiers or signatures of the different plan granularities, as shown in FIG. 7, corresponding to each of the models.

Figure 9:
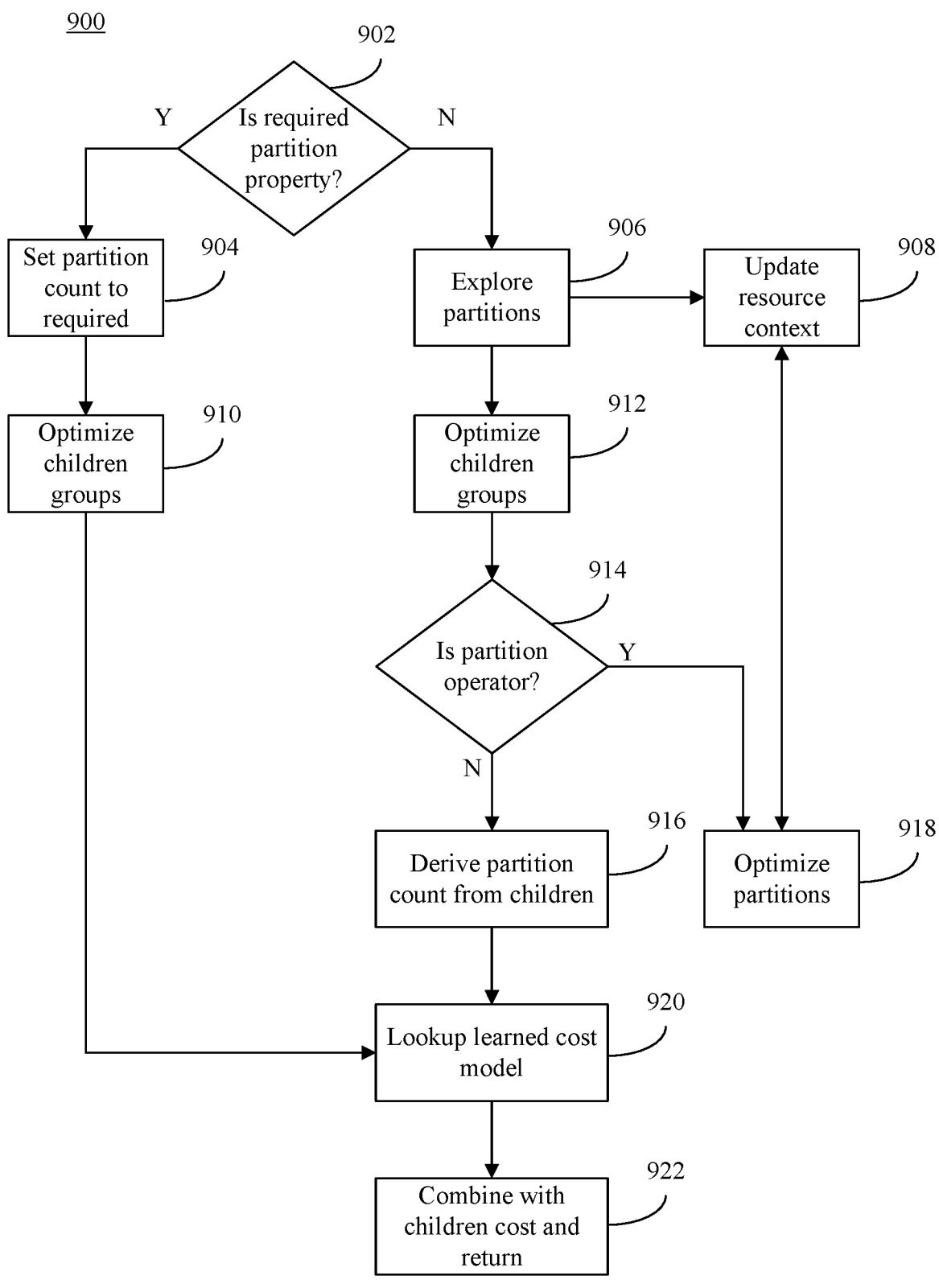
FIG. 9 shows a flowchart of a method for resource-aware query planning, according to an example embodiment.

Finally, for invoking the learned cost models during query optimization, the Optimize Input task (described in Section III.B.1) of the Cascades framework may be modified. In the Cascades framework, the Optimize Input task is the final optimization task for an expression where the cost of a physical operator is computed. In implementations, FIG. 9 shows a flowchart of a method for resource-aware query planning, according to an example embodiment. In FIG. 9, it is shown how example embodiments described herein may be implemented in conjunction with the Optimize Input task of the Cascades framework, e.g., integrating learned cost models inside the optimizer. After deriving the partition counts (described in greater detail in the next section), calls to the default cost-models may be replaced with invocations of the learned models as shown in FIG. 9. In example embodiments, features that learned models may utilize can be derived from the same set of statistics that are used by the default model. Partition count may be one of features that is not reused in some instances. Instead, a more optimal partition count may be determined during optimization since it is directly related with the number of machines, and hence the query latencies. The partition selection process is described in greater detail below.

2. Resource-Aware Query Planning

Problem.

Ad described earlier, the partition count may be an important feature in determining the cost of an operator. This is because the degree of parallelism (i.e. number of machines or containers allocated), a key factor in massively parallel databases, may depend on the partition count. Therefore, picking the right partition count is important for optimizing the operator costs. In SCOPE, the partition count, and thus the number of machines for a given stage (all operators on the same stage share the same partition count) may be decided primarily by partitioning operators (e.g., Merge for stage 2 in FIG. 10) based on local costs. For example, in stage 2 of FIG. 10, Merge selects a partition count of 2 as it result in smallest local cost (i.e., 15). Operators above Merge (i.e., Reduce and Output) derive the same partition count, resulting in a total cost of 305 for the entire stage with a massive fraction of the overall cost (i.e., 200) coming from Reduce. Instead of 2, the partition count of 16 is better in this instance: it reduces the cost of Reduce to 50 while only marginally increasing the cost of Merge to 25, resulting in a much lower overall cost of 125. As shown, therefore, not optimizing the partition count for the entire stage results in a sub-optimal plan. Furthermore, while the optimal partition count varies across operators, the requirement that all operators in a stage must have the same partition count further makes the problem non-trivial. Thus, the current optimizers should be extended in a minimally invasive fashion to make it resource-aware by efficiently exploring the partition counts during query planning Approach.

Figure 10:
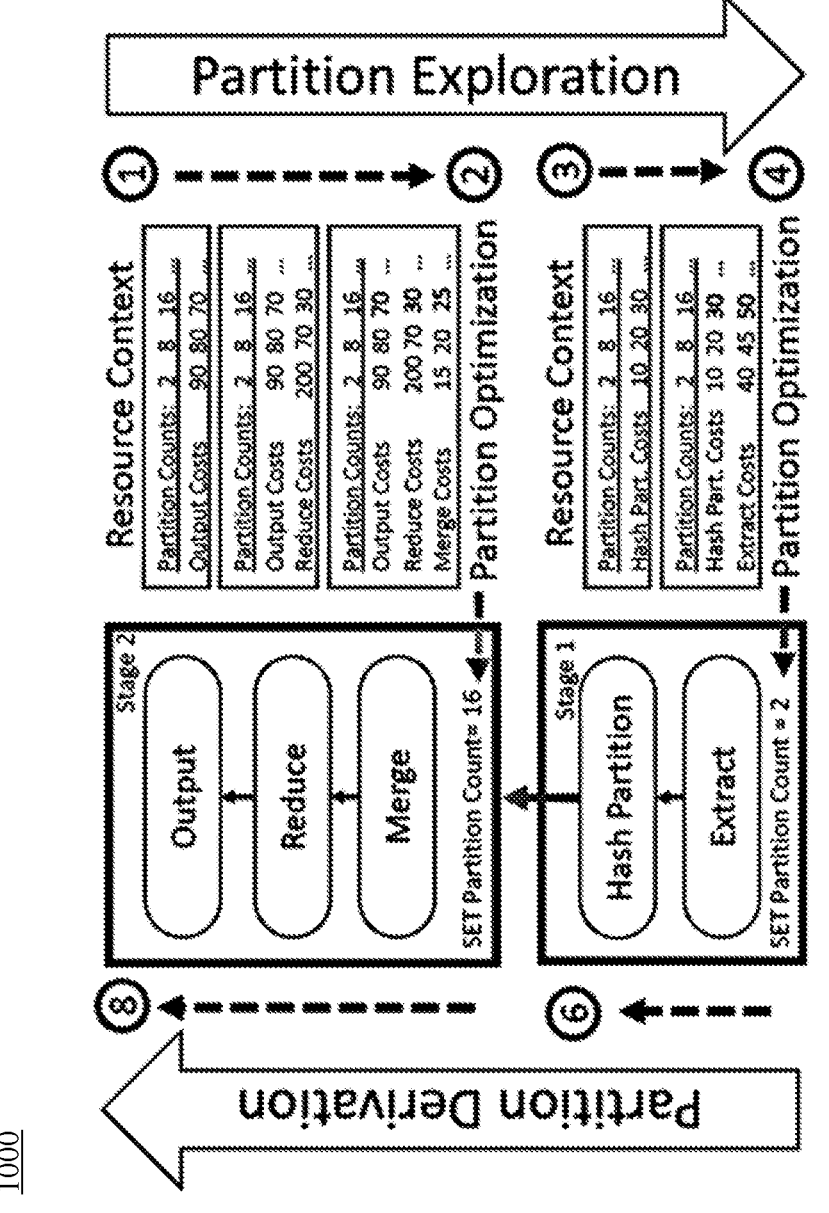
FIG. 10 illustrates an example system for resource-aware query planning, according to an example embodiment.

A resource-aware query planning approach may be implemented in accordance with embodiments (outlined in FIG. 9 and illustrated in FIG. 10). The notion of a resource-context may first be utilized, within the optimizer-context, for passing context necessary for partition optimization (or more generally resource optimizations) across operators in a stage. Furthermore, a partition exploration step may be added (more generally resource-exploration), where each physical operator attaches either a list of learned costs for different partition counts, or an analytical partition count model to the resource-context. Both of these modes of partition exploration are described in more detail in the next section.

As shown in FIG. 9, which is a flowchart of a method for resource-aware query planning, according to an example embodiment, if a partition comes as required property from upstream operators (step 902 of FIG. 9), the partition count may be set to the required value without exploration (step 904 of FIG. 9), and children groups may be optimized as described herein (step 910 of FIG. 9).

If the partition count does not come as a required property from upstream operators, partition exploration may be performed (step 906). For instance, in stage 2 of FIG. 10, the resource-context table shows the learned cost for different partition counts as added by each of the three operators at the beginning of the Optimize Input task (step 906 in FIG. 9). Children groups may first be optimized (step 912), and it may be determined whether a partitioning operator is present (step 914). On reaching the stage boundary, for instance, the partitioning operator performs partition optimization (step 918 in FIG. 9) to select the stage optimal partition count and a resource context may be updated (step 908). The partitioning operator sets its local partition count to the selected one. For example, in stage 2 of FIG. 10, the Merge operator sets the partition count to 16, which has the least cost of 125 across all operators. Thereafter, all upper level operators simply derive the partition count from the partitioning operator (step 916 in FIG. 9), similar to how they may be derived in the standard query planning. The stage optimal partition count is then used to estimate each operators' local costs using the learned models (step 920), and the costs may be combined and returned (step 922), which may result in an overall lower cost.

The above resource-aware query planning with the three new abstractions to the Cascades framework, namely the resource-context, resource-exploration, and resource-optimization, may also incorporate additional resources such as memory sizes, number of cores, and virtual machine (VM) instance types, and other infrastructure level decisions to jointly optimize for both plan and resources. While some implementations may allow these other resources to be varied, implementations are not so limited. However, even where such resources may not be varied, partition counts may still be varied, which can be one of the more important resources in some distributed systems. Moreover, embodiments described herein can also be applied to other top down query optimizers (or other optimizers generally), such as Spark, Flink, Calcite, etc., as appreciated by those skilled in the relevant arts.

As described in Section III.F, the resource-aware query planning can not only generate better plans in terms of latency, resource savings may also be achieved. One challenge, however, is that estimating the cost for every partition count for each operator in the query plan can enlarge the search space and make query planning difficult. An approach to address this challenge is discussed below.

3. Efficient Resource Exploration

Two techniques are discussed for efficiently exploring the partition counts, without greatly expanding the search space.

Sampling-Based Approach. Instead of considering every single partition count, only a sample of partition counts are explored and the one with the lowest cost may be selected. One option is to consider a uniform sample over the set of all possible containers for the tenant or the cluster. However, the relative change in partition may be more interesting when considering its influence on the cost, e.g., a change from 1 to 2 partitions is expected to influence the cost more than a change from 1200 to 1210 partitions. Thus, partition counts are sampled in a geometrically increasing sequence, where a sample $x_{i+1}$ depends on its previous values as follows: $x_{i+1} = [x_i + x_i/s]$ with $x_0 = 1$, $x_1 = 2$, and $x_i + 1 < P_{max}$, here s is a skipping coefficient to decide the gap between successive samples. A large s may lead to a large sample and thus more accurate predictions. A large s, however, may also increase the prediction time. Overall, for m physical operator mappings, and $P_{max}$ maximum possible partition count, $m \log_{(s+1)/s} P_{max}$ cost model invocations are made. In examples, it was observed that s=2 with a sample size of 20 in a range 0 to 3000 results in reasonable accuracy, and leads to more accurate results compared to uniform and randomly sampling approaches with the same sample size.

Sample-based approach may the search space for exploring the partition counts. However, there are two limitations of this approach: (i) low sampling frequency can result partition counts that can be far from optimal, and (ii) high sampling frequency can quickly grow the number of model invocations, first for the individual learned models, and then for the combined model. Therefore, a different approach is discussed that can be more efficient in finding a single optimal partition count analytically from the learned models.

Analytical Approach.

In implementations, the learned individual models can also be reused to directly understand the relationship between the partition count and the cost of an operator. One insight is that only features where partition count is present may be relevant for partition exploration, while the others can be considered constants since their values are available during partition exploration. Thus, operator cost can be expressed follows:

$$\text{cost } \alpha \frac{(\theta_1 * I + \theta_2 * C + \theta_3 * I * C)}{P} + \theta_c * P$$

Here, I, C, and P refer to Input cardinality, Cardinality and Partition count respectively. During query optimization, I, C, I*C are known, therefore:

$$\text{cost } \alpha \frac{\theta_P}{P} + \theta_c * P.$$

Intuitively, $$\frac{\theta_P}{P}$$

corresponds to the processing cost per partition, and $\theta_c * P$ corresponds to the overhead with each partition. The cost decreases with the increase in the partition count (due to less processing per partition) but after a certain number of partitions, the communication overhead dominates which results in the increase in cost. Extending the above relationship across all operators (say n in number) on a stage, the relationship can be modeled as:

$$\text{cost } \alpha \frac{\Sigma_{i=1}^{n} \theta_{P_i}}{P} + \sum_{i=1}^{n} \theta_{C_i} * P$$

There are three possible scenarios: (i) $\Sigma_{i=1}^{n}\theta_{P_i}$ is negative while $\Sigma_{i=1}^{n}\theta_{C_i}$ is positive: a maximum number of partitions for the stage can be achieved since there is no overhead of increasing the number of partitions, (ii) $\Sigma_{i=1}^{n}\theta_{P_i}$ is positive while $\Sigma_{i=1}^{n}\theta_{C_i}$ is negative: the partition count may be set at a minimum as increasing the partition count may increase the cost, and (iii) $\Sigma_{i=1}^{n}\theta_{P_i}$ and $\Sigma_{i=1}^{n}\theta_{C_i}$ are either both positive or both negative: the optimal partition count can be derived by differentiating the cost equation with request to P:

$$P_{opt} = \sqrt{\frac{\theta_{P1} + \theta_{P2} + \dots \theta_{Pn}}{\theta_{C1} + \theta_{C2} + \dots \theta_{Cn}}}$$

Thus, during resource exploration, each operator calculates $\theta_P$ and $\theta_C$ and adds them to resource-context. During resource-optimization, the partitioning operator computes the optimal partition for the stage using the above formulation, thereby avoiding exponential invocations of the learned cost models. Overall for m physical operators over $P_{max}$ partition counts, the analytical model makes only 5 m model invocations, a factor $\log_{(s+1)/s} P_{max}$ less than the sampling-based approach. It has been observed that the analytical model incurs only few tens of invocations while the sampling-based approach can incur several thousands depending on the skipping coefficients. In Section III.F, the accuracy of the sampling strategy is empirically compared with the analytical model, as well as with other sampling strategies such as uniform and random sampling.

F. Experiments

In this section, learned cost models are evaluated with respect to the default optimizer. The same statistics (e.g., cardinality, average row length) are fed to the learned models that are used by the default cost model. The goals of the experiment are four-fold: (i) to compare the prediction accuracy of the learned cost models when using different machine learning models, (ii) to evaluate the effectiveness of various sampling strategies and the analytical approach in finding the optimal resource (i.e. partition count), (iii) to test the coverage and accuracy of the learned cost models over varying test windows, and (iv) to analyze the performance of plans produced by the learned cost models using both the TPC-H benchmark and production workloads. Each is discussed below.

1. Accuracy

The same production Microsoft workload as discussed in Section III.B.1 is considered, consisting of tens of thousands of SCOPE jobs appearing in a single day from one of the largest customers, Asimov. The default cost model was compared with five of the most commonly used machine learning models: (i) Elastic net, a regularized linear-regression model, (ii) DecisionTree Regressor, (iii) Random Forest, (iv) Gradient Boosting Tree, and (v) Multilayer Perceptron Regressor (MLP). For each of the models, the same set of features as depicted in Table 1 and 2, since adding additional features was not observed in some instance to result in significant improvements.

Cross-validation results over the entire workload for different machine learning models were observed. In particular, the CDF (fraction of operators) of the fraction of cost predictions, one prediction for each physical operator in the plan, and ratio of the estimated cost and the actual runtime were analyzed. The following observations were made. First, almost all the machine learning models result in more accurate results compared to the default cost models. Second, linear-regression, decision-tree and as well as their ensemble-based variants result in similar accuracy results. Decision-tree and its ensemble-based variants performed marginally better than elastic net for subgraph instances with many training samples (>1000). While per-operator models typically have large number of training samples, other subgraph models had fewer samples (<100). Finally, MLP, surprisingly, has the worst accuracy among all the models. This is again due to fewer training samples. The performance of MLP model is relatively better over operator models compared to over other subgraphs, but still worse than other learning models. Overall, the 50th and the 95th percentile errors of the combined model are 10× and 1000× better than the default SCOPE cost model.

Thus, it was observed that it is possible to learn highly accurate cost models from the query workload. The contrast between the accuracy with the robustness of these learned models is discussed in greater detail below.

2. Robustness

The robustness (described in Section III.D) of learned models in terms of both coverage as well as accuracy and correlation with runtimes, over a long test window of one month will now be discussed. Coverage may be described as the fraction of subgraphs for which learned cost models are applicable. The same production workload as used in the previous section may be considered.

Coverage Over Varying Test Window.

The coverage of different subgraph models may be described over varying test window. The first day (day 0) workload may be used for training the individual models, and the next day for training the combined model. The coverage of per-operator and combined model may be considered as 100% because they learn one model for each physical operator. The coverage of per-subgraph models, strictest among all the models, was observed to be about 58% after 2 days in experimentation and was observed to decrease to 37% after 28 days. Similarly, the coverage of per-subgraphApprox ranged between 75% and 60% in experimentation. The per-operatorinput model, on the other handle remained more stable between 78% and 84% during testing.

Accuracy and Correlation Over Varying Test Window.

While the median error percentage of learned models improved on default cost model predictions by 3-15×, the 95% error percentage was observed to better by over three orders of magnitude during experimentation. The error across subgraph learned models was observed to increase slowly over the first two weeks after which it increases much faster, especially that of the per-subgraph model. This is due to the decrease in the coverage of subgraph models. The error of per-operator model also increased over weeks, but at a slower rate. Overall, for subgraph models, the 95% percentile error percentages grew worse compared to the median error. Similarly, predicted costs from learned models were much more correlated with the actual runtimes, having high Pearson correlation (generally between 0.70 and 0.96), compared to default cost models that have a very small correlation (around 0.1). A high correlation over a duration month of 1 month shows that learned models can better discriminate between two candidate physical operators. Overall, based on these results, retraining every 10 days should be acceptable, with a median error of about 20%, 95% error of about 200%, and Pearson correlation of around 0.80.

Robustness of Combined Model.

The combined model (i) may have 100% coverage, (ii) matched the accuracy of best performing individual model at any time, and has a high correlation (>0.80) with actual runtimes, and (iii) gives relatively stable performance with graceful degradation in accuracy over longer run. Together, these results show that the combined model is indeed robust.

3. Accuracy of Partition Exploration

As described above, the same partition count as used by the default optimizer for predicting costs has been used. The accuracy of various sampling strategies (uniform, random, and geometric) as well as the analytical model (discussed in Section III.E.2) for finding the partition count that leads to optimal cost for a given operator is evaluated. A subset of 200 operators from the production workload was taken, and all partition counts in a range of 0 to 3000 were explored to find the optimal cost (i.e., minimum across all partitions) for each of the operator. Overall, it was observed that as the sample size increases, the accuracy improves for all sampling approaches. However, the analytical model, although approximate, gave more accurate results compared to sampling-based approaches until a sample size of about 15 to 20, with much fewer model invocations. Furthermore, for a sample size of 20, it was observed that geometrically increasing sampling strategy led to more accurate results compared to uniform and random approaches. This is because geometrically increasing strategy takes more samples when the values are smaller, where costs tend to change more strongly compared to higher values. The effectiveness of partition exploration on a per operator basis was analyzed in the foregoing. In the next section, a more holistic analysis is described on how partition exploration helps produce more efficient execution plans.

4. Performance

The performance evaluation described below is split into two parts. First, a case-study is presented on the TPC-H benchmark, explaining in detail the plan changes caused by the learned cost models. Then, the runtime performance over production workloads is presented. For these evaluation, a new version of the SCOPE runtime was deployed on the production clusters implementing techniques described herein and the performance of this runtime was compared with the default production SCOPE runtime.

I. Case-Study on TPCH Workload

A TPC-H dataset was generated with a scale factor of 1000, i.e., total input of 1 TB. All 22 queries were ran 10 times, each time with randomly chosen different parameters, to generate the training dataset. The cost models were then trained on this workload and the learned models were fed back to re-run all 22 queries. The performance with and without the feedback was compared. For each observation, the average of 3 runs was taken. Overall, 7 TPC-H queries had plan changes. Out of these, 5 changes led to improvement in latency as well as total processing time, while 2 changes led to performance regression. The differences from each of these seven queries are described below.

Q8, Q9.

For both queries, the learned cost models helped in improving the performance by choosing a different partition count, compared to the default optimizer, when merge joining 100 partitions of the Part table. Q8 joins Part with 200 partitions of the LineItem table, while Q9 joins Part with 250 partitions of the output of joining LineItem and Supplier tables. For both queries, the default optimizer performs the merge join over 250 partitions, thereby repartitioning both Part and the other join input into 250 partitions over the Partkey column. However, with learned cost models, the merge join is performed over 100 partitions, which requires repartitioning only the other join inputs and not the Part table. Furthermore, re-partitioning 200 or 250 partitions into 100 partitions is cheaper, since it involves partial merge, compared to re-partitioning them into 250 partitions. Finally, the learned cost models also change the join between Nations and Supplier tables from merge join to a hash join. Overall these changes result in an improvement of 10% to 15% in the end-to-end latency, and 5% to 8% in the total processing time (CPU hours).

Q16.

An improvement in performance was observed primarily because of the resource-awareness aspect with the learned cost models. For the final aggregation and top-k operations, both the learned and the default optimizer repartition the 250 partitions from the previous operator's output on the final aggregation key. While the default optimizer repartitions into 128 partitions, the learned cost models pick 100 partitions. The aggregation cost has almost negligible change due to change in partition counts. However, repartitioning from 250 to 100 turns out to be substantially faster than re-partitioning from 250 to 128 partitions, giving an overall improvement of about 25-30% in runtime and 8-10% in processing time with the learned cost models. While for Q8 and Q9 improvements were achieved by changing the partition counts to the other join input's (i.e., Part table) partition count and skipping the costly exchange operation, the partition count was changed to a new number, that would be difficult to arrive at without resource-awareness.

Q20.

For a join between Nations and Supplier Tables, learned cost models changes the merge join operator to a hash join, resulting in an improvement of 16% to 18% in latency, and an improvement of about 10% in total processing time.

Q11, Q17, Q22.

These queries involve a scan operation (Part in Q11, LineItem in Q17, and Customer in Q22) immediately followed by two aggregations, both on different keys. For such tables, the default optimizer applies a special case where it tries to scan the same table twice in parallel, followed by partitioning on the aggregation key (if required). However, the learned optimizer, follows the typical approach of first scanning these tables, and then repartitioning them into two different copies, one for each aggregation. Not scanning redundantly and aggregating in parallel results in performance regressions in these queries, with 20% and 30% increase in latency and 10% and 2% increase in processing time for Q17 and Q22 respectively. One downside with default optimizer's strategy is that enough number of machines should be available to scan twice in parallel, otherwise one of the scans is blocked until the other concurrent running operations finish and free up machines. As a result of this, it was observed that the learned cost models led to improvement in performance for Q11. Nevertheless, after turning on the resource-awareness, learned optimizer can have multiple scan operators running in parallel with different partition counts, thereby helping prevent the increase in latency.

After adding resource-awareness, Q17 still had an overhead of 10%. This was because learned cost models add local aggregation (not performed by default optimizer) before the global one to improve the performance. However, doing this actually degrade the latency as it does not help in reducing data. Moreover, while currently learned models did not learn on the execution traces from its own feedback, such learning can potentially resolve some of the regressions.

II. Production Workload

Example performance evaluation results are presented below from the same production workload as used in the previous sections. Since production resources are expensive, a subset of the workload was selected, similar to prior work, as follows. The jobs with learned cost model feedback are recompiled, and jobs that had at least one change in physical operator implementations were selected, e.g., for aggregation (hash vs stream grouping), join (hash vs merge), addition or removal of grouping, sort or exchange operators; filtering out those that have redundant scan operators with the default cost model plans, as discussed above. Seventeen such jobs were selected and executed with and without the learned cost model feedback over the same production data, while redirecting the output to a dummy location, similar to prior work.

A change in end-to-end latency for each of the jobs with respect to their latency when using default cost model was observed. In examples, a positive change denotes a decrease in latency. Like for TPC-H jobs, the change in the total processing time (CPU hours) was analyzed to better understand the changes. While most of the time, these changes resulted in improvement in latency, there were jobs that were adversely affected by these changes. Overall, a decrease in end-to-end latency of about 70% of these jobs was observed, with about 30% of the jobs having increase in their latency.

The typical strategy to improve latency in massively parallel systems is to scale out the processing, i.e., increase the degree of parallelism by increasing the number of partitions. Higher parallelism increases the total processing time, but it is expected to decrease the end to end latency. Interestingly, example experiments showed that this strategy did not always help. The resource-aware learned model was able to improve the end-to-end latency of 10 out of 12 jobs with less degree of parallelism, resulting in large amount of reduction (up to 70%) in total processing time. Thus, resource-awareness has the potential to achieve both performance improvement as well as cost savings.

Overheads.

Even though a large number of learned models were built, the models may be trained and validated independently and in parallel. Thus, the parallel model trainer uses SCOPE to significantly speedup the training process. For example, it takes less than 4 hours to analyze and learn models from over more than 50K jobs from one of the largest production clusters at Microsoft. On average, the number of jobs to analyze are much fewer, and the overall training and validation process can be finished in less than 2 hrs.

In terms of the optimization time and the memory usage, about 5-10% increase was observed in the optimization time for most of the jobs when using learned cost models. However, since the optimization time is often in orders of few hundreds of milliseconds, the overhead incurred here is negligible compared to the overall compilation time (orders of seconds) as well as the potential gains that can be achieved in the end-to-end latency (orders of 10s of minutes). For memory usage, an increase by roughly 70-90 MB was observed when loading all the learned models simultaneously for a production cluster running more than a thousand jobs. About 80% of the memory is taken by the specialized models with the remaining used by the combined models, which is not problematic in many big data environments.

5. Discussion

It is possible to learn accurate yet robust cost models from the query workload. Given the complexities and variance in the modern cloud environments, the model accuracies are not perfect. Yet, they offer two to three orders of magnitude more accuracy and improvement in correlation from less than 0.1 to greater than 0.7 over the current techniques. The combined meta model further helps to achieve full workload coverage without sacrificing accuracy significantly. In fact, the combined model retains the accuracy consistently over a longer duration of time. While the accuracy and robustness gains from the learned cost models are obvious, the performance implications are more nuanced. These are often due to various design decisions made to work with the current cost models. For instance, SCOPE jobs tend to over-partition at the leaf levels and leverage the massive scale-out possible for improving latency of jobs. Such decisions could be revisited in the light of the newer learned cost models. However, for a working system, cases where cost feedback leads to regressions should be identified, and reason about them when deciding whether or not to provide the feedback in the first place. In case, the customers are not bothered with some limited time regressions, a faster loop can be trained for the early stages of deployment to automatically correct the poor plans by feedback back their new costs.

Finally, in accordance with example embodiments described herein, the traditional use-case of a cost model for picking the physical query plan are discussed. However, several other cost model use-cases are relevant in cloud environments, where accuracy of predicted costs can be crucial. Examples include performance prediction, allocating resources to queries, estimating task runtimes for scheduling, estimating the progress of a query especially in server-less query processors, and running what-if analysis for physical design selection.

G. Related Work

This section summarizes the related work in this section.

Several earlier works have used machine learning for estimating the query execution time of a given physical plan in centralized databases. In particular, the operator and subplan-level models share similarities with the operator and operator-subgraph model. However, the coverage-accuracy gap between the two models was determined to be substantially large. To bridge this gap, additional mutually enhancing models are described and then combined the predictions of these individual models into a model, that achieves the advantages in terms of accuracy and coverage. Additionally, none of these works consider integrating resources (e.g., finding optimal number of machines for each operator), a crucial determinant of cost of operators in cloud environments. There are other works on query progress indicators that use the run time statistics from the currently running query to tell how much percentage of the work has been completed for the query. Example embodiments described herein, in contrast, use compile time features to make the prediction before the execution starts.

Cardinality is one key input to cost estimation and several learning and feedback-driven approaches have been proposed. However, such approaches have either focused only on recurring or strict subgraphs, or learn only the ratio between the actual and predicted cardinality that can go wrong in many situations. Importantly, as discussed in Section III.B, fixing cardinalities alone do not always lead to accurate costs. There are other factors such as resources (e.g., partitions) consumed, operator implementations (e.g., custom operators), and hardware characteristics (e.g., parallel distributed environment) that could determine cost.

Dynamic or progressive query optimization copes with inaccurate cost estimates by re-optimizing a plan if estimated statistics are found to be inaccurate at runtime. However, this approach has three major drawbacks: (i) cardinality estimation errors are known to propagate exponentially and so much of the query may have already been executed before the system can correct the really bad estimates, (ii) adjusting the query plan, in case of reoptimization, is tedious in a distributed system, since intermediate data needs to be materialized (blocking any pipelined execution), and stitched to the new plan, and (iii) the overheads are incurred for every single query, since the adjustments are not made at compile time. Instead, techniques described herein leverage feedback at compile time, i.e., optimize the current query using the statistics collected from past query executions.

Several works find the optimal resources given a physical query execution plan. They either train a performance model or apply non-parametric Bayesian optimization techniques with a few sample runs to find the optimal resource configuration. However, the optimal execution plan may itself depend on the resources, and therefore in accordance with implementations described herein, the optimal cost and resources may be jointly determined. Nevertheless, the ideas from resource optimization work can be leveraged in implementations to reduce the search space, especially if multiple hardware types are considered.

Finally, there is a recent trend of applying machine learning techniques to improve different components of a data system. The most prominent being learned indexes, which overfits a given stored data to a learned model that provides faster lookup as well as smaller storage footprint. In some more disruptive approaches, the vision is to replace the traditional query optimizers with one built using neural networks. In contrast, embodiments described herein focus on improving the cost-estimation of operators and the goal is to integrate the learned models into existing query optimizers in a minimally invasive manner.

IV. Example Mobile and Stationary Device Embodiments

Query processing system 102, query-generating entity 104, query pre-processor 106, query optimizer 108, query execution engine 110, relational data store(s) 112, resource consumption learning system 114, query execution repository 302, resource consumption model generator 304, resource consumption model 305, operator-subgraph model 306, operator-subgraph approximation model 308, operator-inputs model 310, operator model 312, logical operator determiner 314, physical operator determiner 316, resource consumption evaluator 318, query plan selector 320, any of the components shown in FIGS. 6-8 and 10, flowchart 200, flowchart 400, flowchart 500, and/or flowchart 900 may be implemented in hardware, or hardware combined with one or both of software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For instance, one or more of query processing system 102, query-generating entity 104, query pre-processor 106, query optimizer 108, query execution engine 110, relational data store(s) 112, resource consumption learning system 114, query execution repository 302, resource consumption model generator 304, resource consumption model 305, operator-subgraph model 306, operator-subgraph approximation model 308, operator-inputs model 310, operator model 312, logical operator determiner 314, physical operator determiner 316, resource consumption evaluator 318, query plan selector 320, any of the components shown in FIGS. 6-8 and 10, flowchart 200, flowchart 400, flowchart 500, and/or flowchart 900 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. Note that electronic circuits such as ASICs and FPGAs may be used to accelerate various computations such as checksums, hashing, encryption, compression, etc.

Figure 11:
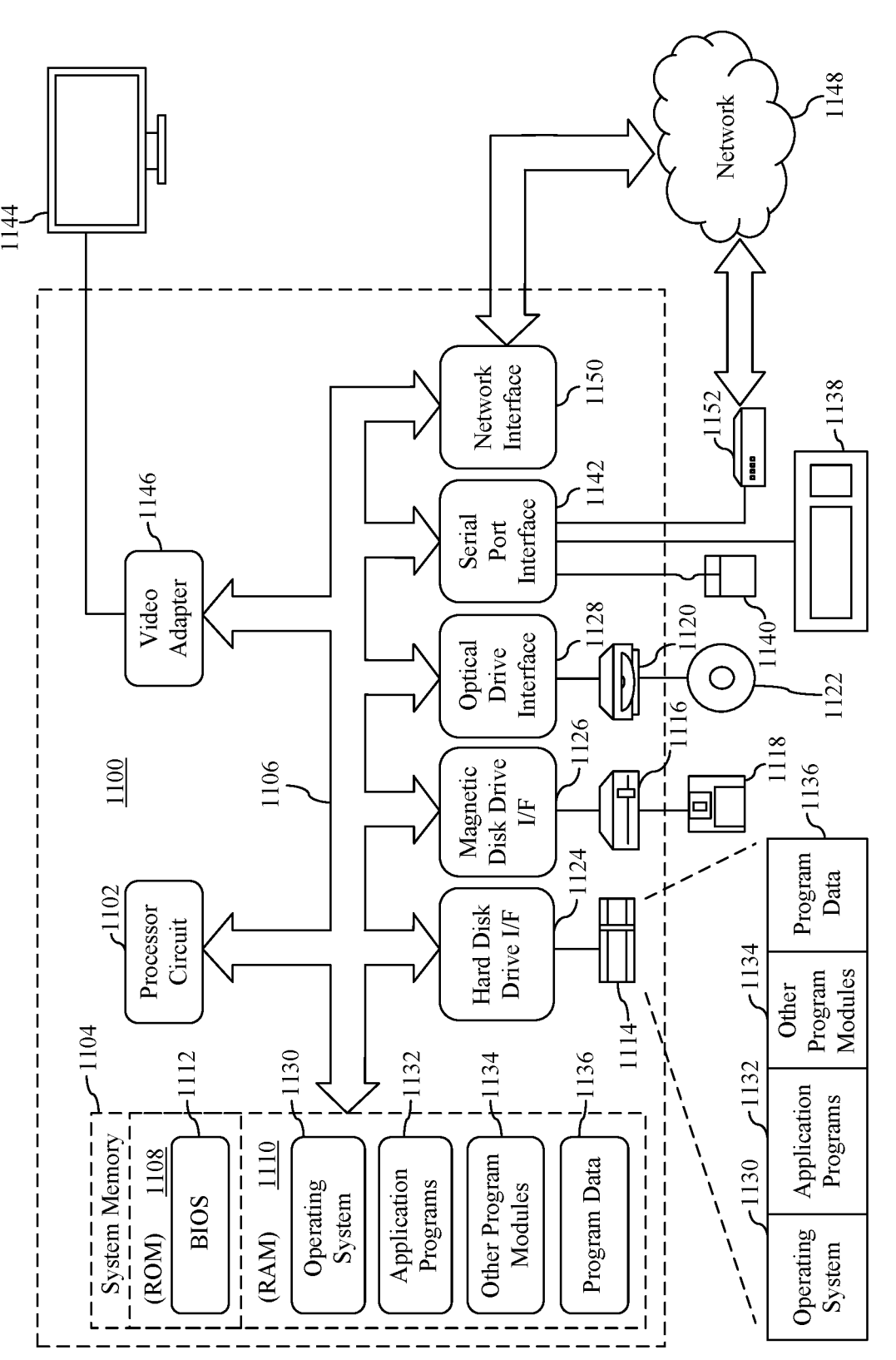
FIG. 11 is a block diagram of an example computing device that may be used to implement example embodiments described herein.

FIG. 11 depicts an example processor-based computer system 1100 that may be used to implement various example embodiments described herein as described above. For example, any of query processing system 102, query-generating entity 104, query pre-processor 106, query optimizer 108, query execution engine 110, relational data store(s) 112, resource consumption learning system 114, query execution repository 302, resource consumption model generator 304, resource consumption model 305, operator-subgraph model 306, operator-subgraph approximation model 308, operator-inputs model 310, operator model 312, logical operator determiner 314, physical operator determiner 316, resource consumption evaluator 318, query plan selector 320, and/or any of the components shown in FIGS. 6-8 and 10 may be implemented in one or more computing devices similar to computing device 1100 in stationary or mobile computer embodiments, including one or more features of computing device 1100 and/or alternative features. The description of system 1100 provided herein is provided for purposes of illustration and is not intended to be limiting. Embodiments may be implemented in further types of computer systems, as would be known to persons skilled in the relevant art(s).

As shown in FIG. 11, system 1100 includes a processing unit 1102, a system memory 1104, and a bus 1106 that couples various system components including system memory 1104 to processing unit 1102. Processing unit 1102 may comprise one or more microprocessors or microprocessor cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, BLU-RAY™ disk or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 1130, one or more application programs 1132, other program modules 1134, and program data 1136. Application programs 1032 or other programs 1034 may include, for example, computer program logic (e.g., computer program code or instructions) for implementing query processing system 102, query-generating entity 104, query pre-processor 106, query optimizer 108, query execution engine 110, relational data store(s) 112, resource consumption learning system 114, query execution repository 302, resource consumption model generator 304, resource consumption model 305, operator-subgraph model 306, operator-subgraph approximation model 308, operator-inputs model 310, operator model 312, logical operator determiner 314, physical operator determiner 316, resource consumption evaluator 318, query plan selector 320, any of the components shown in FIGS. 6-8 and 10, flowchart 200, flowchart 400, flowchart 500, and/or flowchart 900 (including any suitable step of flowcharts 200, 400, 500, or 900), and/or further example embodiments described herein.

A user may enter commands and information into system 1100 through input devices such as a keyboard 1138 and a pointing device 1140. Other input devices (not shown) may include a microphone, joystick, game controller, scanner, or the like. In one embodiment, a touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB). Such interfaces may be wired or wireless interfaces.

A display 1144 is also connected to bus 1106 via an interface, such as a video adapter 1146. Display screen 1144 may display information, as well as being a user interface for receiving user commands and/or other information (e.g., by touch, finger gestures, virtual keyboard, etc.). In addition to display 1144, system 1100 may include other peripheral output devices (not shown) such as speakers and printers.

System 1100 is connected to a network 1148 (e.g., a local area network or wide area network such as the Internet) through a network interface or adapter 1150, a modem 1152, or other suitable means for establishing communications over the network. Modem 1152, which may be internal or external, is connected to bus 1106 via serial port interface 1142. As used herein, the terms "computer program medium," "computer-readable medium," and "computer-readable storage medium" are used to generally refer to memory devices or storage structures such as the hard disk associated with hard disk drive 1114, removable magnetic disk 1118, removable optical disk 1122, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150, serial port interface 1142, or any other interface type. Such computer programs, when executed or loaded by an application, enable system 1100 to implement features of embodiments of the present methods and systems described herein. Accordingly, such computer programs represent controllers of the system 1100.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

V. Additional Example Embodiments

A system for evaluating a resource consumption of a query is disclosed herein. The system includes: one or more processors; and one or more memory devices that store program code configured to be executed by the one or more processors, the program code comprising: a logical operator determiner configured to determine a logical operator representation of a query to be executed; a physical operator determiner configured to transform the logical operator representation to two or more physical operator representations for executing the query; a resource consumption evaluator configured to apply a plurality of resource consumption models trained based at least on a history of query executions to each of the physical operator representations to determine a resource consumption estimate of each of the physical operator representations; and a query plan selector configured to select a particular one of the physical operator representations based on the determined resource consumption estimates.

In one implementation of the foregoing system, the physical operator determiner is configured to select a partition count for each of the physical operator representations prior to the resource consumption evaluator determining the resource consumption estimate of each of the physical operator representations, the partition count being selected based at least on a resource consumption estimate of a portion of each physical operator representation.

In another implementation of the foregoing system, each of the plurality of resource consumption models comprises a machine-learning model that is trained based at least on a feature set associated with the history of query executions, the feature set corresponding to each machine-learning model being weighted differently from one another.

In another implementation of the foregoing system, at least one resource consumption model is trained based at least on prior query executions that comprise a physical operator tree with a common schema as a physical operator tree of at least one of the physical operator representations.

In another implementation of the foregoing system, at least one resource consumption model is trained based at least on prior query executions that comprise a physical operator tree with a common root operator as a physical operator tree of at least one of the physical operator representations.

In another implementation of the foregoing system, at least one resource consumption model is trained based at least on prior query executions that comprise a physical operator tree with a common root operator, a common set of leaf node inputs, and a same number of total operators as a physical operator tree of at least one of the physical operator representations.

In another implementation of the foregoing system, at least one resource consumption model is trained based at least on prior query executions that comprise a physical operator tree with a common root operator, a common set of leaf node inputs, and a different number of total operators as a physical operator tree of at least one of the physical operator representations.

In another implementation of the foregoing system, the resource consumption evaluator is configured to apply the plurality of resource consumption models by applying a combined model generated from the plurality of resource consumption models.

In another implementation of the foregoing system, the combined model is generated from a weighting of each of the plurality of resource consumption models.

A method for evaluating a resource consumption of a query is disclosed herein. The method includes: determining a logical operator representation of a query to be executed; transforming the logical operator representation to two or more physical operator representations for executing the query; applying a plurality of resource consumption models trained based at least on a history of query executions to each of the physical operator representations to determine a resource consumption estimate of each of the physical operator representations; and selecting a particular one of the physical operator representations based on the determined resource consumption estimates.

In one implementation of the foregoing method, the method further comprises:

selecting a partition count for each of the physical operator representations prior to determining the resource consumption estimate of each of the physical operator representations, the partition count being selected based at least on a resource consumption estimate of a portion of each physical operator representation.

In another implementation of the foregoing method, each of the plurality of resource consumption models comprises a machine-learning model that is trained based at least on a feature set associated with the history of query executions, the feature set corresponding to each machine-learning model being weighted differently from one another.

In another implementation of the foregoing method, at least one resource consumption model is trained based at least on prior query executions that comprise a physical operator tree with a common schema as a physical operator tree of at least one of the physical operator representations.

In another implementation of the foregoing method, at least one resource consumption model is trained based at least on prior query executions that comprise a physical operator tree with a common root operator as a physical operator tree of at least one of the physical operator representations.

In another implementation of the foregoing method, the resource consumption evaluator is configured to apply the plurality of resource consumption models by applying a combined model generated from the plurality of resource consumption models.

A computer-readable memory is disclosed herein. The computer-readable memory has program code recorded thereon that when executed by at least one processor causes the at least one processor to perform a method comprising: determining a logical operator representation of a query to be executed; transforming the logical operator representation to two or more physical operator representations for executing the query; applying a plurality of resource consumption models trained based at least on a history of query executions to each of the physical operator representations to determine a resource consumption estimate of each of the physical operator representations; and selecting a particular one of the physical operator representations based on the determined resource consumption estimates.

In one implementation of the foregoing computer-readable memory, the method further comprises: selecting a partition count for each of the physical operator representations prior to determining the resource consumption estimate of each of the physical operator representations, the partition count being selected based at least on a resource consumption estimate of a portion of each physical operator representation.

In another implementation of the foregoing computer-readable memory, each of the plurality of resource consumption models comprises a machine-learning model that is trained based at least on a feature set associated with the history of query executions, the feature set corresponding to each machine-learning model being weighted differently from one another.

In another implementation of the foregoing computer-readable memory, at least one resource consumption model is trained based at least on prior query executions that comprise a physical operator tree with a common schema as a physical operator tree of at least one of the physical operator representations.

In another implementation of the foregoing computer-readable memory, at least one resource consumption model is trained based at least on prior query executions that comprise a physical operator tree with a common root operator as a physical operator tree of at least one of the physical operator representations.

VI. Conclusion

Predicting accurate costs can be important for finding efficient execution plans in big data systems. At the same time, modeling query executing costs can be difficult in these systems. In the foregoing, techniques are presented to learn cost models from the large cloud workloads. Cloud workloads are highly heterogenous in nature and no one model fits all. Instead, common subexpression patterns in the workload are levered and specialized models are learned for each pattern. The accuracy and coverage trade-off of these specialized models are described and additional mutual enhancing models to bridge the gap are presented in the foregoing. The predictions from all of these individual models are combined into a robust model that may provide advantages in both accuracy and coverage over a sufficiently long period of time. Furthermore, the learned cost models may be integrated with existing query optimization frameworks. Details on example integrations are provided with SCOPE, a Cascade-style query optimizer, and learned models are shown to be used to efficiently find both the query and resource optimal plans. In the foregoing, therefore, machine learning may be applied to the core of a query processing system in a practical manner.

While various embodiments of the present methods and systems have been described above, they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments but should be defined only in accordance with the following claims and their equivalents.

What is claimed is:

1. A system for evaluating a resource consumption of a query, the system comprising:

one or more processors; and one or more memory devices that store program code configured to be executed by the one or more processors, the program code configured to perform operations that comprise:

determining a logical operator representation of a query to be executed;

transforming the logical operator representation to two or more physical operator representations for executing the query, each physical operator representation corresponding to a query plan;

applying a plurality of machine learning-based resource consumption models trained based at least on a history of query executions to each of the physical operator representations to determine a resource consumption estimate of each of the physical operator representations, each of the plurality of machine learning-based resource consumption models being trained based on different physical operator tree characteristics; and selecting a particular query plan to execute the query, the selected query plan corresponding to one of the physical operator representations based on the determined resource consumption estimates.

2. The system of claim 1, wherein the program code is further configured to perform operations that comprise selecting a partition count for each of the physical operator representations prior to the determining the resource consumption estimate of each of the physical operator representations, the partition count being selected based at least on a resource consumption estimate of a portion of each physical operator representation.

3. The system of claim 1, wherein each of the plurality of machine learning-based resource consumption models comprises a machine-learning model that is trained based at least on a feature set associated with the history of query executions, the feature set corresponding to each machine-learning model being weighted differently from one another.

4. The system of claim 1, wherein at least one machine learning-based resource consumption model of the plurality of machine learning-based resource consumption models is trained based at least on prior query executions that comprise a physical operator tree with a common schema as a physical operator tree of at least one of the physical operator representations.

5. The system of claim 1, wherein at least one machine learning-based resource consumption model of the plurality of machine learning-based resource consumption models is trained based at least on prior query executions that comprise a physical operator tree with a common root operator as a physical operator tree of at least one of the physical operator representations.

6. The system of claim 1, wherein at least one machine learning-based resource consumption model of the plurality of machine learning-based resource consumption models is trained based at least on prior query executions that comprise a physical operator tree with a common root operator, a common set of leaf node inputs, and a same number of total operators as a physical operator tree of at least one of the physical operator representations.

7. The system of claim 1, wherein at least one machine learning-based resource consumption model of the plurality of machine learning-based resource consumption models is trained based at least on prior query executions that comprise a physical operator tree with a common root operator, a common set of leaf node inputs, and a different number of total operators as a physical operator tree of at least one of the physical operator representations.

8. The system of claim 1, wherein the applying the plurality of machine learning-based resource consumption models comprises applying a combined model generated from the plurality of resource consumption models.

9. The system of claim 8, wherein the combined model is generated from a weighting of each of the plurality of machine learning-based resource consumption models.

10. A computer-implemented method for evaluating a resource consumption of a query, the method comprising:

determining a logical operator representation of a query to be executed;

transforming the logical operator representation to two or more physical operator representations for executing the query, each physical operator representation corresponding to a query plan;

applying a plurality of machine learning-based resource consumption models trained based at least on a history of query executions to each of the physical operator representations to determine a resource consumption estimate of each of the physical operator representations, each of the plurality of machine learning-based resource consumption models being trained based on different physical operator tree characteristics; and selecting a particular query plan to execute the query, the selected query plan corresponding to one of the physical operator representations based on the determined resource consumption estimates.

11. The computer-implemented method of claim 10, further comprising:

selecting a partition count for each of the physical operator representations prior to determining the resource consumption estimate of each of the physical operator representations, the partition count being selected based at least on a resource consumption estimate of a portion of each physical operator representation.

12. The computer-implemented method of claim 10, wherein each of the plurality of machine learning-based resource consumption models comprises a machine-learning model that is trained based at least on a feature set associated with the history of query executions, the feature set corresponding to each machine-learning model being weighted differently from one another.

13. The computer-implemented method of claim 10, wherein at least one machine learning-based resource consumption model of the plurality of machine learning-based resource consumption models is trained based at least on prior query executions that comprise a physical operator tree with a common schema as a physical operator tree of at least one of the physical operator representations.

14. The computer-implemented method of claim 10, wherein at least one machine learning-based resource consumption model of the plurality of machine learning- based resource consumption models is trained based at least on prior query executions that comprise a physical operator tree with a common root operator as a physical operator tree of at least one of the physical operator representations.

15. The computer-implemented method of claim 10, wherein the applying the plurality of machine learning-based resource consumption models comprises applying a combined model generated from the plurality of machine learning-based resource consumption models.

16. A computer-readable memory having computer program code recorded thereon that when executed by at least one processor causes the at least one processor to perform a method comprising:

determining a logical operator representation of a query to be executed;

transforming the logical operator representation to two or more physical operator representations for executing the query, each physical operator representation corresponding to a query plan;

applying a plurality of machine learning-based resource consumption models trained based at least on a history of query executions to each of the physical operator representations to determine a resource consumption estimate of each of the physical operator representations, each of the plurality of machine learning-based resource consumption models being trained based on different physical operator tree characteristics; and selecting a particular query plan to execute the query, the selected query plan corresponding to one of the physical operator representations based on the determined resource consumption estimates.

17. The computer-readable memory of claim 16, further comprising:

selecting a partition count for each of the physical operator representations prior to determining the resource consumption estimate of each of the physical operator representations, the partition count being selected based at least on a resource consumption estimate of a portion of each physical operator representation.

18. The computer-readable memory of claim 16, wherein each of the plurality of machine learning-based resource consumption models comprises a machine-learning model that is trained based at least on a feature set associated with the history of query executions, the feature set corresponding to each machine-learning model being weighted differently from one another.

19. The computer-readable memory of claim 16, wherein at least one machine learning-based resource consumption model of the plurality of machine learning-based resource consumption models is trained based at least on prior query executions that comprise a physical operator tree with a common schema as a physical operator tree of at least one of the physical operator representations.

20. The computer-readable memory of claim 16, wherein at least one machine learning-based resource consumption model of the plurality of machine learning-based resource consumption models is trained based at least on prior query executions that comprise a physical operator tree with a common root operator as a physical operator tree of at least one of the physical operator representations.

* * * * *